(12) United States Patent
Tulsyan et al.

(10) Patent No.: US 11,679,872 B1
(45) Date of Patent: Jun. 20, 2023

(54) TILTER MOTOR COOLING APPARATUS FOR VERTICAL TAKEOFF AND LANDING AIRCRAFT AND OPERATING METHOD OF THE SAME

(71) Applicant: Archer Aviation, Inc., San Jose, CA (US)

(72) Inventors: Bharat Tulsyan, San Jose, CA (US); Christopher M. Heath, Avon, OH (US); Kerry Manning, Parker, CO (US); Giovanni Droandi, San Jose, CA (US)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 18/064,538

(22) Filed: Dec. 12, 2022

(51) Int. Cl.
*B64C 29/00* (2006.01)
*B64D 33/08* (2006.01)

(52) U.S. Cl.
CPC .......... *B64C 29/0033* (2013.01); *B64D 33/08* (2013.01)

(58) Field of Classification Search
CPC ............................ B64C 29/0033; B64D 33/08
USPC ....................................................... 244/12.4
See application file for complete search history.

(56) References Cited

U.S. PATENT DOCUMENTS

| 2003/0094537 | A1 | 5/2003 | Mjsten-Brown |
| 2015/0266571 | A1 | 9/2015 | Bevirt et al. |
| 2016/0200436 | A1 | 7/2016 | North et al. |
| 2017/0349268 | A1* | 12/2017 | Duffy ........................ B64C 9/14 |
| 2018/0251227 | A1 | 9/2018 | Ross et al. |
| 2019/0135429 | A1 | 5/2019 | Karem |
| 2019/0329859 | A1* | 10/2019 | Bevirt ................... B64C 23/005 |
| 2021/0387724 | A1 | 12/2021 | Mclaren et al. |
| 2022/0250756 | A1 | 8/2022 | Wagner et al. |

FOREIGN PATENT DOCUMENTS

WO WO-2021222528 A1 * 11/2021

* cited by examiner

*Primary Examiner* — Brady W Frazier
(74) *Attorney, Agent, or Firm* — Finnegan, Henderson, Farabov, Garrett & Dunner, LLP

(57) ABSTRACT

A VTOL aircraft includes a plurality of tilt propellers configured to be rotated between a forward cruise configuration and a vertical lift configuration. A nacelle or other structure may be configured to form a low pressure zone from the wake of the tilt propellers when operating in the lift configuration. The low pressure zone may include an outlet side of a cooling path. Due to the low pressure, airflow may be induced through the cooling path even in the absence of strong air pressure at the inlet side. During a cruise operation when the VTOL aircraft is in forward motion, the nacelle or other structure may be aligned with a baffle to form an exhaust channel for the cooling airflow.

33 Claims, 18 Drawing Sheets

TILTER MOTOR COOLING APPARATUS FOR VERTICAL TAKEOFF AND LANDING AIRCRAFT AND OPERATING METHOD OF THE SAME

TECHNICAL FIELD

This disclosure relates generally to the field of powered aerial vehicles. More particularly, and without limitation, the present disclosure relates to innovations in tilt-rotor aircraft that use electrical propulsion systems. Certain aspects of the present disclosure generally relate to cooling systems for tilter motors. Other aspects of the present disclosure generally relate to improvements in cooling paths that may be used in other types of vehicles but provide particular advantages in aerial vehicles.

SUMMARY

Some embodiments of the present disclosure provide a tilt apparatus of a vertical takeoff and landing (VTOL) craft, comprising: a propeller configured to be tiltable between a lift configuration and a cruise configuration; a motor assembly coupled to the propeller; and a nacelle comprising an air inlet and an air outlet for a thermal transfer device configured to thermally couple to the motor assembly; wherein the air inlet is configured to receive a portion of a propwash from the propeller when the propeller is operated in the lift configuration; wherein the air outlet is configured so that an air pressure at the air outlet is less than an air pressure at the air inlet when the propeller is operated in the lift configuration.

Some embodiments of the present disclosure provide a method of operating a tilt apparatus of a vertical takeoff and landing (VTOL) craft. The method may comprise: tilting a propeller to a lift configuration, the propeller being coupled to a motor assembly; directing propwash from the tilt propeller over an outside of a nacelle, the nacelle comprising an air inlet and an air outlet for a thermal transfer device configured to thermally couple to the motor assembly; and generating a negative pressure zone at the air outlet by the propwash directed over the outside of the nacelle, the negative pressure zone causing air to flow from the air inlet to the air outlet.

BRIEF DESCRIPTIONS OF FIGURES

Figure 1A:
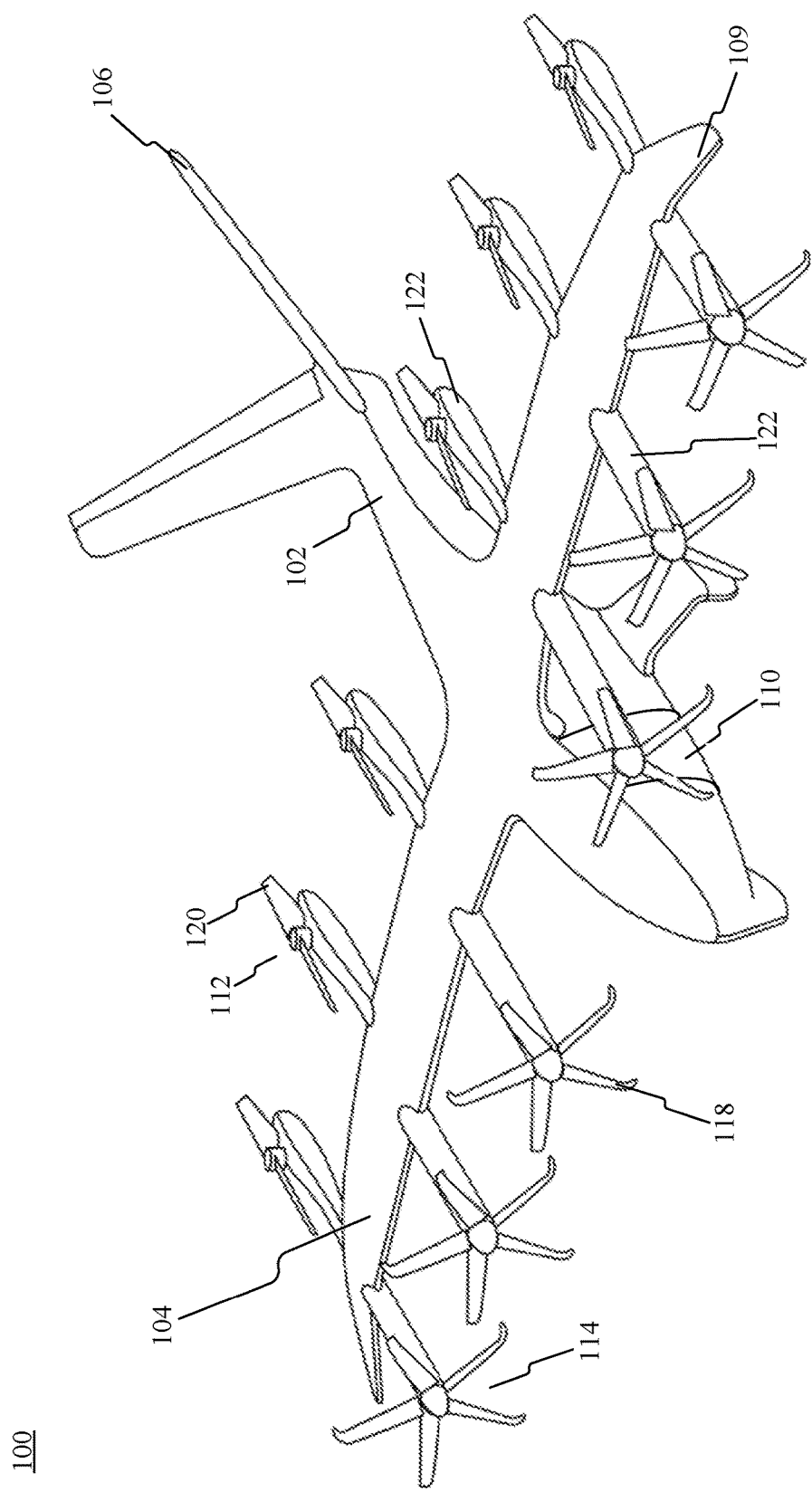
Figure 1B:
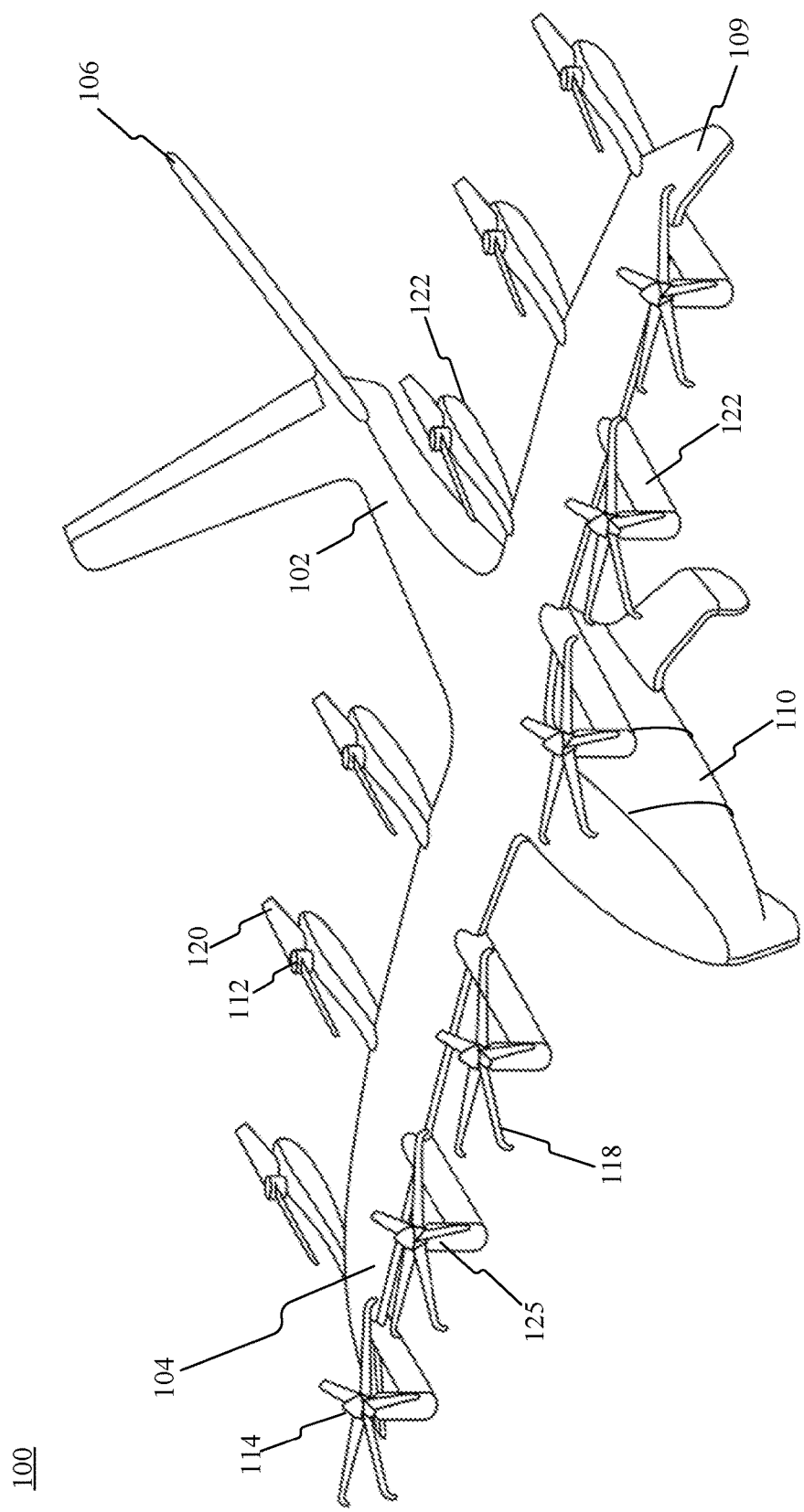

FIGS. 1A-B are schematic diagrams illustrating an exemplary VTOL aircraft, consistent with disclosed embodiments.

FIGS. 2A-I are schematic diagrams illustrating exemplary tilt propellers in VTOL aircraft, consistent with embodiments of the present disclosure.

Figure 3A:
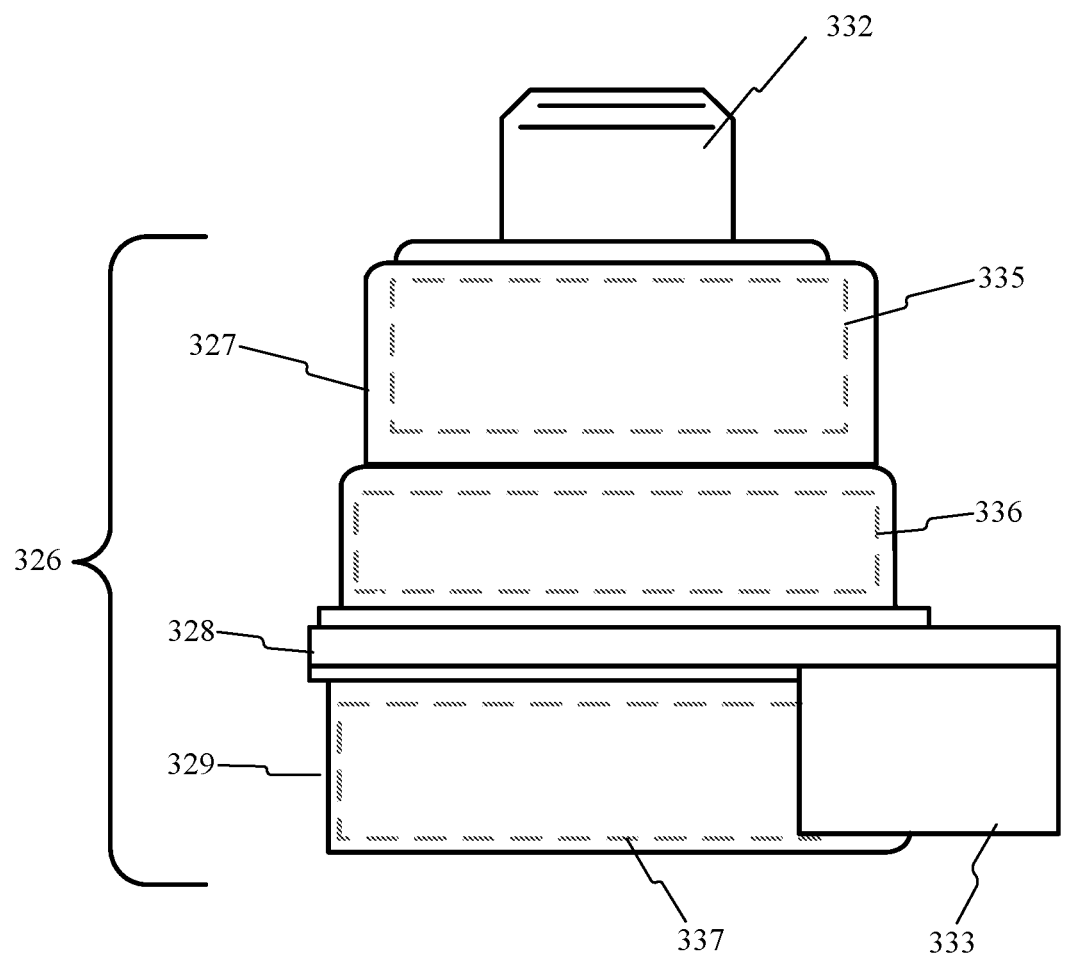
Figure 3B:
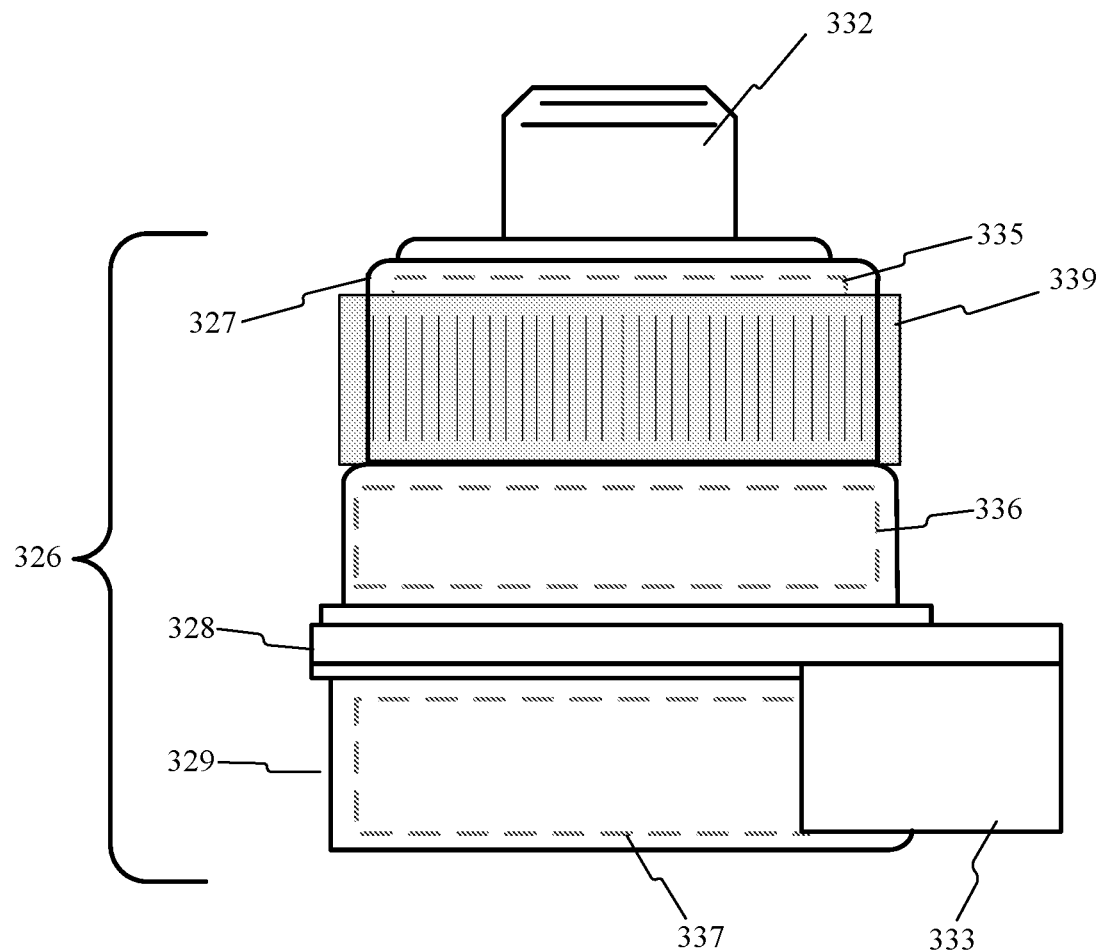

FIGS. 3A-B are schematic diagrams illustrating exemplary motor assemblies in VTOL aircraft, consistent with embodiments of the present disclosure.

FIGS. 4A-E are schematic diagrams illustrating exemplary cooling flow paths in tilt motor assemblies for VTOL aircraft, consistent with embodiments of the present disclosure.

DETAILED DESCRIPTION

The present disclosure addresses components of electric vertical takeoff and landing (eVTOL) aircraft primarily for use in a non-conventional aircraft. For example, the eVTOL aircraft of the present disclosure may be intended for frequent (e.g., over 50 flights per workday), short-duration flights (e.g., less than 100 miles per flight) over, into, and out of densely populated regions. The aircraft may be intended to carry 4-6 passengers or commuters who have an expectation of a low-noise and low-vibration experience. Accordingly, it may be desired that their components are configured and designed to withstand frequent use without wearing, that they generate less heat and vibration, and that the aircraft include mechanisms to effectively control and manage heat or vibration generated by the components. Further, it may be intended that several of these aircraft operate near each other over a crowded metropolitan area. Accordingly, it may be desired that their components are configured and designed to generate low levels of noise interior and exterior to the aircraft, and to have a variety of safety and backup mechanisms. For example, it may be desired for safety reasons that the aircraft are propelled by a distributed propulsion system, avoiding the risk of a single point of failure, and that they are capable of conventional takeoff and landing on a runway. Moreover, it may be desired that the aircraft can safely vertically takeoff and land from and into relatively restricted spaces (e.g., vertiports, parking lots, or driveways) compared to traditional airport runways while transporting around 4-6 passengers or commuters with accompanying baggage. These use requirements may place design constraints on aircraft size, weight, operating efficiency (e.g., drag, energy use), which may impact the design and configuration of the aircraft components.

Disclosed embodiments provide new and improved configurations of aircraft components that are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of eVTOL aircraft components.

In some embodiments, the eVTOL aircraft of the present disclosure may be designed to be capable of both vertical and conventional takeoff and landing, with a distributed electrical propulsion system enabling vertical flight, forward flight, and transition. Thrust may be generated by supplying high voltage electrical power to the electrical engines of the distributed electrical propulsion system, which each may convert the high voltage electrical power into mechanical shaft power to rotate a propeller. Embodiments disclosed herein may involve optimizing the energy density of the electrical propulsion system. Embodiments may include an electrical engine connected to an onboard electrical power source, which may include a device capable of storing energy such as a battery capacitor, or may include one or more systems for harnessing or generating electricity such as a fuel powered generator or solar panel array. Some disclosed embodiments provide for weight reduction and space reduction of components in the aircraft, thereby increasing aircraft efficiency and performance. Given focus on safety in passenger transportation, disclosed embodiments implement new and improved safety protocols and system redundancy in the case of a failure, to minimize any single points of failure in the aircraft propulsion system. Some disclosed embodiments also provide new and improved approaches to satisfying aviation and transportation laws and regulations. For example, the Federal Aviation Administration enforces federal laws and regulations requiring safety components such as fire protective barriers adjacent to engines that use more than a threshold amount of oil or other flammable materials.

In preferred embodiments, the distributed electrical propulsion system may include twelve electrical engines, which may be mounted on booms forward and aft of the main wings of the aircraft. The forward electrical engines may be tiltable mid-flight between a horizontally oriented position (e.g., to generate forward thrust) and a vertically oriented position (e.g., to generate vertical lift). The forward electrical engines may be of a clockwise type in terms of direction of propeller rotation. The aft electrical engines may be fixed in a vertically oriented position (e.g., to generate vertical lift). They may also be of a clockwise type or counterclockwise type in terms of direction of propeller rotation. In some embodiments, an aircraft may possess various combinations of forward and aft electrical engines. For example, an aircraft may possess six forward and six aft electrical engines, four forward and four aft electrical engines, or any other combination of forward and aft engines, including embodiments where the number of forward electrical engines and aft electrical engines are not equivalent. In some embodiments, an aircraft may possess four forward and four aft propellers, where at least four of these propellers comprise tiltable propellers.

In preferred embodiments, for a vertical takeoff and landing (VTOL) mission, the forward electrical engines as well as aft electrical engines may provide vertical thrust during takeoff and landing. During flight phases where the aircraft is in forward flight-mode, the forward electrical engines may provide horizontal thrust, while the propellers of the aft electrical engines may be stowed at a fixed position in order to minimize drag. The aft electrical engines may be actively stowed with position monitoring. Transition from vertical flight to horizontal flight and vice-versa may be accomplished via the tilt propeller subsystem. The tilt propeller subsystem may redirect thrust between a primarily vertical direction during vertical flight mode to a mostly horizontal direction during forward-flight mode. A variable pitch mechanism may change the forward electrical engine's propeller-hub assembly blade collective angles for operation during the hover-phase, transition phase, and cruise-phase.

In some embodiments, in a conventional takeoff and landing (CTOL) mission, the forward electrical engines may provide horizontal thrust for wing-borne take-off, cruise, and landing. In some embodiments, the aft electrical engines may not be used for generating thrust during a CTOL mission and the aft propellers may be stowed in place.

In some embodiments, an electric engine may be housed or connected to a boom of an aircraft and include a motor, inverter, and gearbox. In some embodiments, the motor, inverter, and gearbox may be interfaced such that they share a central axis. In some embodiments, the torque originating in the motor may be sent away from the propellers of the propulsion system and to a gearbox. In some embodiments, a gearbox may provide a gear reduction and then send the torque, via a main shaft, back through a bearing located inside the motor and to the propeller. In some embodiments, an inverter may be mounted on the rear of a gearbox such that a main shaft does not travel through the inverter when outputting torque to the propeller. In some embodiments, the motor, gearbox, and inverter may be interfaced such that a coolant, such as oil, may be used to service the motor, inverter, and/or gearbox, while sharing a common heat exchanger. In some embodiments, the amount of oil used to lubricate and cool the electric engine may vary, including amounts less than one quart, two quarts, three quarts, or any other measured amount of oil.

In some embodiments, a tilt propeller system may include a linear or rotary actuator to change the orientation of a propulsion system during operation. In some embodiments, the pitch of the propulsion system may be changed as a function of the orientation of the propulsion system. In some embodiments, a rotary actuator may include a motor, inverter, and gearbox. In some embodiments, a gearbox may include various types of gears interfacing to provide a gear reduction capable of orienting the propulsion system. In some embodiments, a tilt propeller system may include a redundant configuration such that multiple motors, inverters, and gearboxes are present and interface using a gear. In some embodiments, a configuration utilizing multiple motors, gearboxes, and inverters may allow a failed portion of the redundant configuration to be driven by the motor, inverter, and gearbox of another portion of the configuration. In some embodiments, a gearbox configuration may also allow the tilt propeller system to maintain a propulsion system orientation with the help of, or without, additional power being provided by the system.

In some embodiments, an electrical propulsion system as described herein may generate thrust by supplying High Voltage (HV) electric power to an electric engine, which in turn converts HV power into mechanical shaft power which is used to rotate a propeller. As mentioned above, an aircraft as described herein may possess multiple electric engines which are boom-mounted forward and aft of the wing. The amount of thrust each electric engine generates may be governed by a torque command from the Flight Control System (FCS) over a digital communication interface to each electric engine. Embodiments may include forward electric engines, and may be able to alter their orientation, or tilt. Additional embodiments include forward engines that may be a clockwise (CW) type or counterclockwise (CCW) type. The forward electric engine propulsion subsystem may consist of a multi-blade adjustable pitch propeller, as well as a variable pitch subsystem.

In some embodiments, an aircraft may include aft engines, or lifters, that can be of a clockwise (CW) type or counterclockwise (CCW) type. Additional embodiments may include aft electric engines that utilize a multi-blade fixed pitch propeller.

As described herein, the orientation and use of electric propulsion systems may change throughout the operation of the aircraft. In some embodiments, during vertical takeoff and landing, the forward propulsion systems as well as aft propulsion systems may provide vertical thrust during take-off and landing. During the flight phases where the aircraft is in forward flight-mode, the forward propulsion systems may provide horizontal thrust, while the aft propulsion system propellers may be stowed at a fixed position in order to minimize drag. The aft electric propulsion systems may be actively stowed with position monitoring. Some embodiments may include a transition from vertical flight to horizontal flight and vice-versa. In some embodiments, the transitions may be accomplished via the tilt propeller system (TPS). The TPS redirects thrust between a primarily vertical direction during vertical flight mode to a mostly horizontal direction during forward-flight mode. Additional embodiments may include a variable pitch mechanism that may change the forward propulsion system propeller-hub assembly blade collective angles for operation during the hover-phase, cruise-phase and transition phase. Some embodiments may include a Conventional Takeoff and Landing (CTOL) configurations such that the tilters provide horizontal thrust for wing-borne take-off, cruise and landing. The aft electronic engines are not used for generating thrust during a CTOL mission and the aft propellers are stowed in place.

In some embodiments, an electrical engine as described herein may possess design features which mitigate and protect against uncontained fire, such as utilizing less than one quart, or another non-hazardous quantity, of flammable fluid contained in both the tilt and lift engines, not possessing a nominal ignition source within the electric engines, possessing an engine over temperature operating limit that may be more than 50° C. less than a flammable fluid auto-ignition temperature, overtemperature detection and protection, overvoltage detection and protection, and overcurrent detection and protection. In some embodiments, the design features of the electrical engine may deem it to not be a designated fire zone.

As disclosed herein, an electrical engine may include an inverter and motor; or inverter, gearbox, and motor across various configurations, such as representative configurations as described herein. For example, an electrical engine may include an electrical motor, gearbox, and inverter that all share the same central axis. Additionally, the central axis may be configured along an axis of an output shaft going to the propeller of the aircraft. In such an exemplary configuration, the motor, gearbox, and inverter would all share the output shaft as a central axis and would be circularly oriented around the output shaft. Additional embodiments may include a motor, gearbox, and inverter that are mounted together in a sequence, or a configuration where some of the components are mounted together, such as the motor and gearbox, and another component is located elsewhere, such as the inverter, but wiring systems are used to connect the electrical engine.

As mentioned above, an electrical engine for an aircraft as described here may include some or all of a motor, inverter, and gearbox. Various configurations may include an inverter and motor such that the output shaft of a motor directly provides the speed and torque for a propeller shaft. Additional embodiments of an electrical engine may include a motor, inverter, and a gearbox, wherein the output of a motor may travel through a gearbox that is connected to the output shaft for the propeller; a motor, inverter, and gearbox wherein the output from the motor travels away from the propeller, through a gearbox, where the output shaft for the propeller travels back through the gearbox and motor to the propeller. As described herein, an electrical engine may account for any combination or orientation of some or all of a motor, inverter, and gearbox. Additionally, each configuration or orientation of the electrical engine as disclosed herein may include cooling via air-cooling, coolant liquid, or a mixture of both.

For example, a configuration of an electrical engine may include a motor and inverter wherein the motor is in between the propeller of the aircraft and the inverter. Additionally, a motor may include a gearbox. Further, an inverter may share the same central axis as a motor wherein the inverter may be located in a housing that is cantilevered off of the rear of the motor and may be air cooled. It is recognized that such an inverter orientation would not be an optimum configuration in terms of the housing required to achieve such a cantilevered orientation. Additionally, a motor in this configuration utilizing air cooling may comprise potting material and air fins to assist with cooling of the motor may lead to an even larger increase in mass of the system.

Some embodiments may include an electrical engine, wherein inverter modules may be mounted on the outside of a motor housing. Additional embodiments may include an electrical engine wherein an inverter may be mounted on top of an electrical motor such that the air-cooling fins of the inverter are underneath the propeller. Further embodiments may include an inverter mounted to the back of a motor with air-cooling fins facing out radially, an inverter mounted to the front of a motor with the air-cooling fins facing out radially, an inverter mounted to a motor where the inverter is cooled by a liquid, such as oil, or any other position of the inverter relative to a motor.

Embodiments of an electrical motor may comprise a stator housing, a wound stator assembly, a rotor, various bearings, and any additional components such that to assist in transferring the speed and torque generated by the motor to a propeller.

It is understood that an electrical engine may generate heat during operation and may comprise a heat management system to ensure components of the electrical engine do not fail during operation. In some embodiments, coolant may be used and circulated throughout individual components of the engine, such as an inverter, gearbox, or motor, through some of the components, or through all of the components of the engine to assist with managing the heat present in the engine. Additional embodiments may include using air cooling methods to cool the electrical engine or using a mixture of coolant and air to manage the heat generated during operation in the electrical engine. In some embodiments, the coolant being used may also be the same liquid that is being used as lubricant throughout the inverter, gearbox, or motor. For example, the inverter, gearbox, and motor may be cooled using a liquid or air, or a mixture of air and liquid cooling could be used, such as cooling the motor using air cooling and using liquid cooling in the inverter and gearbox, or any other combination of air and liquid cooling across the inverter, gearbox, and motor or even subsets of those components.

In some embodiments, oil may be used as a lubricant throughout an electrical engine and may also be used as coolant fluid to assist in managing the heat generated by the engine during operation. Further to this example, different amounts of oil may be used to act as both lubricant and coolant fluid in the electrical engine, such as less than one quart, less than two quarts, or any other amount of oil needed to lubricate and cool the electrical engine, in combination with or without the assistance of air cooling. As has been disclosed herein, an electrical engine may have different primary functionalities such as being used only for lifting and landing, and as such only being used in one orientation, or being used during all stages of flight such as lifting, landing, and in-flight. An engine that is used in all stages of flight may experience various orientations throughout flight and may comprise more lubricant and coolant than the engine only used in one orientation. As such, all the engines on an aircraft may not include the same amount of lubricant and coolant. For example, a lifting and landing engine may only require less than one quart of oil while an engine that operates in all stages of flight may require more than one quart of oil. It should be understood that the example embodiments as mentioned herein are representative and do not dictate the bounds of the amount of lubricant and coolant that may be used in an electrical engine.

It is understood that by using oil to not only lubricate the electrical engine but also cool the electrical engine rather than another coolant, additional oil will be added to the system, but that oil will remove traditional components that may be used to cool such an electrical engine. For example, if the electrical engine were cooled by another liquid such as glycol, the engine may comprise separate heat exchangers for both the lubricant fluid and the coolant fluid. As such, in embodiments where a single fluid is being used for both lubrication and cooling, such as oil, an increase in oil would be present but there would only be a need for one heat exchanger, so there may be a decrease in mass, due to using less heat exchangers and potentially other components not being required, of the overall system and a more appealing drag profile may be present. Further, using one substance for the lubrication and cooling of the engine may increase efficiency of the system due to the reduction in mass and the benefits of cooling the engine with a substance rather than relying on air cooling which may have issues traveling throughout the engine.

Additional embodiments of electrical engines may possess various components to ensure any flammable fluids are monitored and prevented from entering certain sections of the electrical engine. Some embodiments may include an electric engine possessing a wet zone enclosure that may be defined by a gearbox, motor, and/or heat exchanger. In some embodiments, an electric engine may possess up to 4 liters of air within the motor-gearbox housing which is in contact with engine oil. Embodiments of a motor-gearbox housing may equalize internal and external pressure using a breather. Embodiments of a breather may include it protruding above nearby design features in order to prevent inadvertent entry of external fluids. Additional embodiments may include a breather that possesses a screen and a circuitous entry path to prevent entry of external debris. Embodiments may include a sight glass being present on both the tilt and lift electric engines in order to check that oil is not overfilled or underfilled during servicing.

Additional embodiments of electrical engines may include active protection features in the forward and aft electrical engines such as monitoring internal temperatures throughout the engine operation, including oil temperature, stator winding sets, inverter bulk capacitors, power modules, control board power modules, control board control processors, control board monitor processors, internal hot-spots, and other various locations throughout the engine. Embodiments may include overtemperature limits that take into account known failure temperatures and operating limits in relation to auto-ignition temperatures of fluids. Some embodiments may include a High Voltage Power System that may have fuses at the high voltage battery terminals which may rapidly disconnect the engine electrical connection irreversibly to mitigate overcurrent events. This overcurrent protection may be activated when the electric engine current draw is greater than the overcurrent operating. As such, in some embodiments, failure conditions which lead to overcurrent may only lead to a transient overheating, arc or spark faults. Some embodiments may include a fire threat characterization test ignition source that may be selected to be a more severe ignition source than a short occurring in the electric engine and being opened by the engine fuse. In some embodiments, an inverter will detect AC overcurrent and isolate the erroneous phase and/or will continuously monitor input DC voltage, and will apply protective actions to keep voltages under the overvoltage operating limit.

During takeoff, landing, hover and cruise, motors and related control components of the VTOL aircraft may generate heat. The heat must be dissipated to prevent degradation or damage to the motor, control components and other elements of the VTOL aircraft.

Some elements may generate different thermal loads during different operational periods. For example, tilt propellers may generate thermal loads within a first range in a "lift" configuration during takeoff, landing, and hover. During forward flight in a "cruise" configuration, the tilt propellers may generate thermal loads in a second range. In some embodiments, the first and second ranges may overlap or may be substantially the same. In some embodiments, the first range may have a higher mid-point than the second range. In some embodiments, the second range may have a higher mid-point than the first range. However, due to the power requirements during takeoff, landing, and hover, some tilt propellers may generate higher thermal loads when operating in a lift configuration than in a cruise configuration.

The problem of different cooling requirements between lift and cruise may be compounded by a difference in the amount of cooling air that is available. For example, in some embodiments, the motor assembly of a tilt propeller may be air-cooled by causing a cooling airflow to contact a thermal transfer device, such as cooling fins or a heat exchanger. The airflow may enter a nacelle, or other covering around the motor assembly, through an air inlet. For instance, air may be directed into the air inlet by the motion of the VTOL aircraft, or it may be forced into the air inlet as propwash from the tilt propeller blades. As used herein, "propwash" may refer to the airflow that is forced away by propeller blades as they rotate. In a cruise configuration, the VTOL aircraft will be moving forward at a high speed, such that sufficient airflow is directed into the air inlet. However, this may not be the case in a lift configuration. The VTOL aircraft may be ascending or descending slowly, or it may even be hovering mid-air, essentially motionless. Therefore, one cannot rely on the velocity of the VTOL aircraft to generate a cooling airflow when operating in the lift configuration. Furthermore, it may be difficult to direct sufficient propwash to the air inlet in the lift configuration because the propwash strength may be relatively weak near the rotational axis in which the motor assembly is located.

Embodiments of the present disclosure provide an improved system and method for generating cooling airflow in a lift configuration of VTOL aircraft. In some embodiments, VTOL aircraft may be designed to take advantage of the stronger propwash at the periphery of the tilt propeller blades by using the stronger propwash to generate a low-pressure wake region at an outlet side of the nacelle. This low-pressure wake region may allow the weaker central propwash to flow through the air inlet and cool the motor assembly, as further described below.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims.

As used herein, the term "tilt propeller" refers to a variable pitch propeller configured to provide thrust for vertical lift and forward propulsion by varying the pitch of the propeller. The term "lift propeller" may refer to a fixed-pitch propeller configured to provide thrust for vertical lift.

FIGS. 1A-B illustrate a VTOL aircraft 100 in a cruise configuration and a vertical take-off, landing and hover configuration (also referred to herein as a "lift" configuration), respectively, consistent with embodiments of the present disclosure. The aircraft 100 may include a fuselage 102, wings 104 mounted to the fuselage 102, and one or more rear stabilizers 106 mounted to the rear of the fuselage 102. A plurality of lift propellers 112 may be mounted to wings 104 and configured to provide lift for vertical take-off, landing and hover. A plurality of tilt propellers 114 may be mounted to wings 104 and may be tiltable between the cruise configuration in which they provide forward thrust to aircraft 100 for horizontal flight, as shown in FIG. 1A, and the lift configuration in which they provide a portion of the lift required for vertical take-off, landing and hovering, as shown in FIG. 1B. As used herein, a lift configuration may refer to a tilt propeller orientation in which the tilt propeller thrust is providing primarily lift to the aircraft. A cruise configuration may refer to a tilt propeller orientation in which the tilt propeller thrust is providing primarily forward thrust to the aircraft.

In some embodiments, lift propellers 112 may be configured for providing lift only, with all propulsion being provided by the tilt propellers. Accordingly, lift propellers 112 may be in fixed positions and may only generate thrust during take-off, landing and hover. Meanwhile, tilt propellers 114 may be tilted to lift configurations in which their thrust is directed downwardly for providing additional lift.

For forward flight, tilt propellers 114 may tilt from their lift configurations to their cruise configurations. In other words, the pitch of tilt propellers 114 may be varied from a pitch in which the tilt propeller thrust is directed downward (to provide lift during vertical take-off, landing and hover) to a pitch in which the tilt propeller thrust is directed rearward (to provide forward thrust to aircraft 100). The tilt propellers may tilt about axes that may be perpendicular to the forward direction of the aircraft 100. When the aircraft 100 is in full forward flight during the cruise configuration, lift may be provided entirely by wings 104. Meanwhile, lift propellers 112 may be shut off. The blades 120 of lift propellers 112 may be locked in low-drag positions for aircraft cruising. In some embodiments, lift propellers 112 may each have two blades 120 that may be locked for cruising in minimum drag positions in which one blade is directly in front of the other blade as illustrated in FIG. 1A. In some embodiments, lift propellers 112 have more than two blades. In some embodiments, tilt propellers 114 include more blades 118 than lift propellers 112. For example, as illustrated in FIGS. 1A-B, lift propellers 112 may each include, e.g., two blades and tilt propellers 114 may each include, e.g., five blades. In some embodiments, tilt propellers 114 may have, e.g., from 2 to 5 blades.

In some embodiments, the aircraft may include only one wing 104 on each side of fuselage 102 (or a single wing that extends across the entire aircraft) and at least a portion of lift propellers 112 may be located rearward of wings 104 and at least a portion of tilt propellers 114 may be located forward of wings 104. In some embodiments, all of lift propellers 112 may be located rearward of wings 104 and all of tilt propellers 114 may be located forward of wings 104. According to some embodiments, all lift propellers 112 and tilt propellers 114 may be mounted to the wings—i.e., no lift propellers or tilt propellers may be mounted to the fuselage. In some embodiments, lift propellers 112 may be all located rearwardly of wings 104 and tilt propellers 114 may be all located forward of wings 104. According to some embodiments, all lift propellers 112 and tilt propellers 114 may be positioned inwardly of the wing tips 109.

In some embodiments, lift propellers 112 and tilt propellers 114 may be mounted to wings 104 by booms 122. Booms 122 may be mounted beneath wings 104, on top of the wings, and/or may be integrated into the wing profile. In some embodiments, one lift propeller 112 and one tilt propeller 114 may be mounted to each boom 122. Lift propeller 112 may be mounted at a rear end of boom 122 and tilt propeller 114 may be mounted at a front end of boom 122. In some embodiments, lift propeller 112 may be mounted in a fixed position on boom 122. In some embodiments, tilt propeller 114 may mounted to a front end of boom 122 via a hinge. Tilt propeller 114 may be mounted to boom 122 such that tilt propeller 114 is aligned with the body of boom 122 when in the cruise configuration, forming a continuous extension of the front end of boom 122 that minimizes drag for forward flight.

In some embodiments, aircraft 100 may include, e.g., one wing on each side of fuselage 102 or a single wing that extends across the aircraft. According to some embodiments, the at least one wing 104 is a high wing mounted to an upper side of fuselage 102. According to some embodiments, the wings include control surfaces, such as flaps and/or ailerons. According to some embodiments, the wings may have curved wing tips 109 for reduced drag during forward flight.

In some embodiments, rear stabilizers 106 include control surfaces, such as one or more rudders, one or more elevators, and/or one or more combined rudder-elevators. The wing(s) may have any suitable design. For example, the wings have a tapering leading edge or a tapering trailing edge. In some embodiments, the wings may have a substantially straight leading edge in the central section of wings 104.

Aircraft 100 may include at least one door 110 for passenger entry and exit. In some embodiments, the door 110 may located beneath and forward of wings 104 as seen in FIGS. 1A-B.

In some embodiments, lift propellers 112 or tilt propellers 114 may canted relative to at least one other lift propeller 112 or tilt propeller 114. As used herein, canting refers to a relative orientation of the rotational axis of the lift propeller/tilt propeller about a line that is parallel to the forward-rearward direction, analogous to the roll degree of freedom of the aircraft. Canting of the lift propellers and/or tilt propellers may help minimize damage from propeller burst by orienting a rotational plane of the lift propeller/tilt propeller discs (the blades plus the propeller portion onto which the blades are mounted) so as to not intersect critical portions of the aircraft (such areas of the fuselage in which people may be positioned, critical flight control systems, batteries, adjacent propellers, etc.) or other propeller discs and may provide enhanced yaw control during flight.

Lift propellers 112 may be canted in any suitable manner and combination. For example, lift propellers 112 may be canted away from fuselage 102, such that lift propellers on a first side of the fuselage are canted in a first direction, and lift propellers on a second side of the fuselage are canted in a second direction. In some embodiments, lift propellers 112 may be canted according to a corresponding tilt propeller. Any suitable combination of canting and/or non-canting of the lift propellers relative to one another and relative to the tilt propellers can be used to achieve desired performance characteristics.

Further discussion of VTOL aircraft may be found in US Patent Publication No. 2021/0362849, which is incorporated by reference in its entirety.

As discussed above, motors and related control components of VTOL aircraft may generate heat during operation. The heat must be dissipated to prevent degradation or damage to the motor, control components and other elements of the VTOL aircraft. For example, cooling may be achieved by directing an air flow over a heated component. The heated component may be, e.g., a motor or other heat-generating component, or it may be, e.g., a heat exchanger configured to receive heat from a heat-generating component by way of a liquid heat exchange medium.

However, it may be difficult to achieve a sufficient airflow to cool the tilt motors in the lift configuration for the reasons discussed above. Therefore, it may be desirable to provide a tilt motor cooling system capable of producing sufficient airflow even when the VTOL aircraft is operating in the lift configuration.

A. Example Tilt Propeller Embodiments

FIGS. 2A-I illustrate portions of a VTOL aircraft 200, consistent with embodiments of the present disclosure. VTOL aircraft 200 may be, e.g., similar to VTOL aircraft 100 of FIGS. 1A-B. Elements in FIGS. 2A-I that are similar to those in FIGS. 1A-B may be labeled with corresponding numbers using 2 as the leading digit. For example, in some embodiments, boom 222 of FIGS. 2A-I may be similar to boom 122 of FIGS. 1A-B.

Figure 2A:
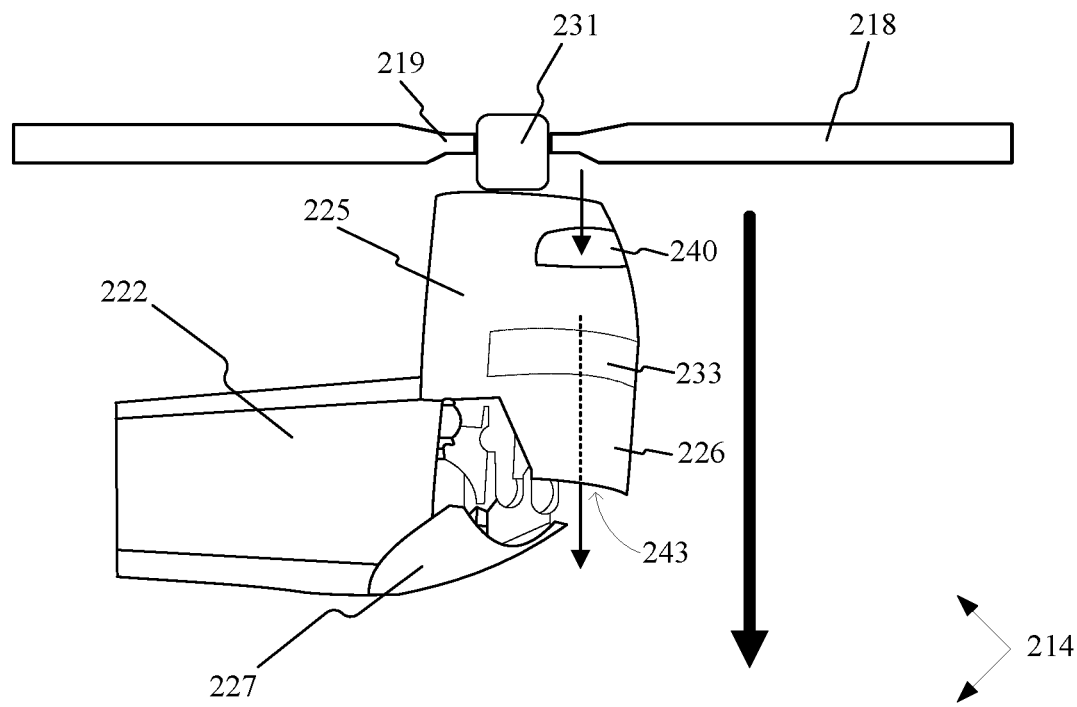
Figure 2A:
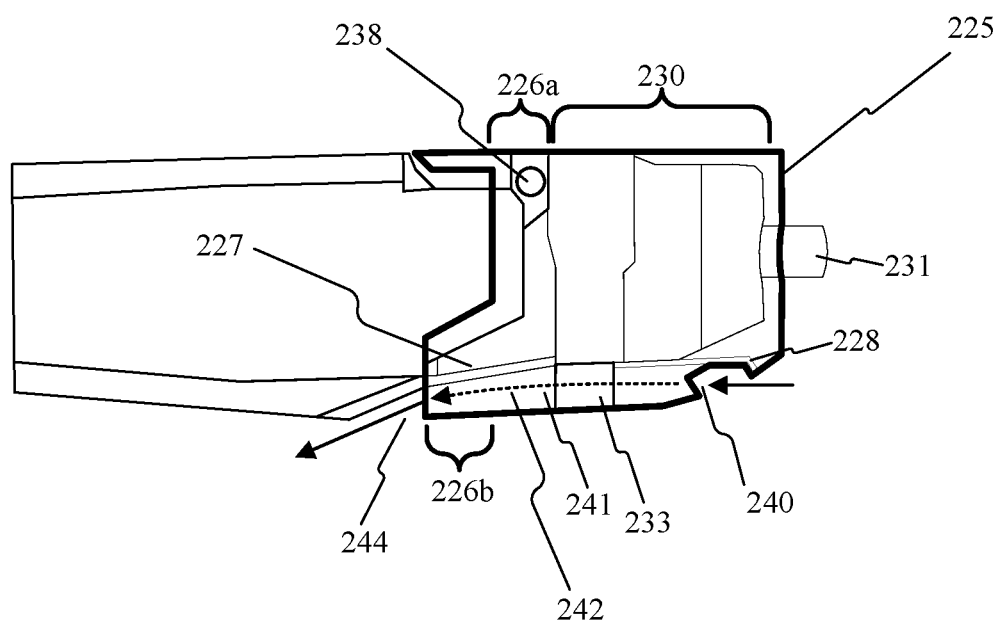

FIG. 2A illustrates a tilt propeller in a lift configuration (at top) and a cruise configuration (at bottom), consistent with embodiments of the present disclosure. Tilt propeller 214 may be coupled to boom 222 and may be tiltable between the lift and cruise configurations by tilt actuator 238. Tilt propeller may comprise: a plurality of propeller blades 218 coupled to hub 231 at blade root 219; a nacelle 225 surrounding a motor assembly 230 and a heat exchanger 233; a boom baffle 227; a nacelle baffle 228; and a tilt actuator 238. Nacelle 225 may further comprise an air inlet 240 and an extending portion 226. The extending portion 226 may be configured to increase the size of a wake region 243 at an air outlet 241 of nacelle 225 and heat exchanger 233.

Propeller blades 218 may direct propwash substantially downward in the lift configuration, as schematically illustrated by downward pointing arrows at the top of FIG. 2A. Air inlet 240 may receive propwash or other airflow as indicated by the thin arrow pointing downward from blade root 219. The propwash may flow through nacelle 225 and into heat exchanger (or other thermal transfer device, such as cooling fins) 233. The propwash may be guided to heat exchanger 233 by nacelle baffle 228 or by other guiding structures. For example, in some embodiments, the baffle function within nacelle 225 may be performed at least in part by an enclosure that covers the outer surface of motor assembly 230. Heat exchanger 233 may transfer heat to the propwash as it passes through to an air outlet side of nacelle 225 and heat exchanger 233, thereby cooling motor assembly 230.

Air inlet 240 is shown as having a substantially arcuate shape, but this is merely exemplary. In practice, air inlet 240 may have any suitable shape, including circular, elliptical, rectangular, slot-shaped, or any other suitable design. Air inlet may comprise a scoop or a cut-out in nacelle 225 of any suitable size or shape. Air inlet 240 may comprise a plurality of air inlets arranged together or at different locations on nacelle 225. For instance, air inlet 240 may comprise a series of slits in nacelle 225. Further, air inlet 240 need not be a fully open aperture, but may comprise a mesh or grid covering, or may have a cover that may be actuated passively or actively.

Air inlet 240 may be located at a radial distance from the center of hub 231 that allows for a desired amount of airflow to enter. In some embodiments, a center of air inlet 240 may be located at a radial distance from hub 231 that is between 20% and 25% of the radius of propellers 218. For example, if propeller 218 extends out to, e.g., 40" from a center of hub 231, a center of air inlet 240 may be located between 8" and 10" from the center of hub 231. In some embodiments, a center of air inlet 240 may be located at a radial distance from hub 231 that is at least, e.g., 10%, 15%, 20%, 25%, 30%, 35%, 40% 45%, 50% or more of the radius of propellers 218.

Note that in FIG. 2A and other drawings, dashed lines are employed for clarity, for example to indicate that heat exchanger 233 is located inside nacelle 225, and to show internal airflow. However, not all internal components are depicted using dashed lines. In some cases, internal components may be depicted using solid lines, or may be omitted.

The strength of the propwash may not be uniform along blade 218 at all radial distances from hub 231. For instance, the thin arrow entering air inlet 240 may indicate a relatively weak propwash, while the thick arrow passing along the outside of nacelle 225 may indicate a relatively strong propwash. Propwash strength may be characterized by various factors such as air pressure, velocity, mass flow rate, etc. Propwash strength may vary along the length of blades 218 for a number of reasons. For instance, the circumferential speed at a point on blade 218 increases with increasing radial distance from the rotational axis at hub 231. Additionally, the contour, width and angular orientation of blades 218 may vary along the blade length. Thus, for example, a narrow blade root 219 located very close to hub 231 may generate significantly weaker propwash than a wide portion of blade 218 located farther away. As a further example, blade 218 may not comprise a tapered blade root 219 at hub 231, and yet a propwash at that location may nonetheless be weak in view of its short radial distance from the rotational axis. In some embodiments, as discussed further below, a propeller blade 218 may be wider near its root than at its periphery, or the blade root 219 may comprise cylindrical shaft. In general, blade designs may vary greatly. However, in some embodiments the blades may be optimized primarily for flight rather than for generating a cooling airflow. Thus, it may be advantageous to optimize nacelle 225 and other components of tilt propeller 214 to increase the airflow through air inlet 240 to heat exchanger 233.

To increase the airflow, nacelle 225 may comprise an extending portion 226 configured to increase the size of a wake region 243 at an outlet side of nacelle 225 and heat exchanger 233. For example, the extending portion may increase the size of wake region 243 by shielding a volume of space from the high pressure airflow around the outside of nacelle 225. A large and relatively low-pressure zone may thus be generated by the strong propwash flowing around the outside of nacelle 225 and past the end of extending portion 226. Air pressure in wake region 243 may be significantly lower than in surrounding regions, including the region of air inlet 240. As a result, even a moderate pressure at air inlet 240 will produce a cooling airflow through the interior of nacelle 225. The moderate pressure at air inlet 240 may correspond to the weak propwash near hub 231, or it may simply correspond to the ambient air pressure in the vicinity of VTOL aircraft 200.

The dimensions and shape of extending portion 226 may depend on the desired dimensions of wake region 243. This in turn may depend on many factors of the particular VTOL aircraft in which tilt propeller 214 is implemented. For example, the extending portion may be designed in consideration of: the cooling needs of tilt motor assembly 230; the size and placement of air inlet 240; the airflow from relatively weak propwash at an inner portion of blade 218 or blade root 219, if any; and the airflow from relatively strong propwash at an outer portion of blade 218. Factors limiting the size of extending portion 226 may include: the weight of nacelle 225; the drag forces that would be generated by an unnecessarily large extending portion; mechanical considerations, such as the need to actuate tilt propeller 214 between lift and cruise orientations without obstruction; and the vertical distance over which strong propwash from an outer portion of blade 218 maintains a coherent or usable airflow.

In some embodiments, extending portion 226 may comprise a depth parallel to the rotational axis of tilt propeller 214. The depth may be expressed as a distance to the end of extending portion 226 from the either a bottom surface of motor assembly 230 (when oriented vertically in the lift configuration) or an outlet side of heat exchanger 233. The depth of extending portion 226 may be selected based on, e.g. factors discussed above or other design considerations. In some exemplary embodiments, extending portion 226 may comprise a depth of at least 4", 8", 12", 16", 20" or more. In some exemplary embodiments, extending portion 226 may comprise a depth of not more than 24", 20", 16", 12", or 8".

In some embodiments, extending portion 226 may substantially or entirely surround the rotational axis of tilt propeller 214 in a plane perpendicular to the rotational axis. In some embodiments, extending portion 226 may almost surround the rotation axis while leaving space to accommodate mechanical features such as tilt actuator 238. In some embodiments, extending portion 226 may only partly surround the rotational axis. In still further embodiments, a full section 226a of extending portion 226 may surround the rotational axis, while a partial section 226b of extending portion 226 only partly surrounds the rotational axis (see bottom in FIG. 2A). The dimension of extending portion 226 in a circumferential direction around the rotational axis may be referred to as the arc length, and may be expressed in angular terms. For example, an extending portion 226 having an arc length of 180° would extend halfway around the rotational axis of tilt propeller 214. Note that terms such as "arc length" and "circumferential" are not intended to imply that a cross-section shape of nacelle 225 must be circular.

As illustrated in the exemplary embodiment of FIG. 2A, full section 226a may have an arc length of substantially 360°, while partial section 226b may have an arc length in the neighborhood of 160°. However, this is only given as an example. The arc lengths may be expressed as, e.g., a minimum arc length, a maximum arc length, or an average arc length along the depth direction of extending portion 226. For example, extending portion 226, or partial section 226b of extending portion 226, may have a minimum arc length of 30°, 60°, 90°, 120°, 150°, or 180°. Extending portion 226, or partial section 226b of extending portion 226, may have a maximum arc length of, e.g., 300°, 270°, 240°, 210° or 180°. Further, as shown in FIG. 2A, the arc length may substantially correspond to an arc length of heat exchanger 233, or that of another airflow path through nacelle 225. For example, when an outlet side of heat exchanger 233 has an arc length of, e.g., 120°, 90°, or 45°, extending portion 226 may be configured with a similar arc length to extend a wake region 243 in the vicinity of the outlet side of heat exchanger 233.

When operating in the cruise configuration as shown at bottom in FIG. 2A, tilt propeller 214 may be rotated by tilt actuator 238 into alignment with boom 222 (blades 218 are omitted for clarity). In the cruise configuration, nacelle 225 may combine with boom baffle 227 to form an exhaust channel 242. For example, nacelle baffle 228 may form a first part of exhaust channel 242 that guides the propwash to an inlet side of heat exchanger 233. Boom baffle 227 may for a second part of exhaust channel 242 that guides the propwash from heat exchanger 233 at air outlet 241. In general, boom baffle 227 and nacelle baffle 228 may be considered portions of an overall baffle structure that may be configured to optimize airflow in both the lift and cruise configurations. Exhaust channel 242 may direct airflow from air outlet 241 to exhaust outlet 244. Exhaust outlet 244 may also be formed by the combination of nacelle 225 and boom baffle 227. Boom baffle 227 may further engage or abut a lower surface of motor assembly 230 or heat exchanger 233. In this way, boom baffle 227 may substantially seal exhaust channel 242 from the remaining interior space of nacelle 225 so that air flows smoothly from air inlet 240 to exhaust outlet 244 without creating excessive drag forces inside nacelle 225.

Because VTOL aircraft 200 moves at high velocity during cruise, there is sufficient cooling airflow available without relying on a wake region 243 as in the lift configuration. Thus, the embodiment of FIG. 2A achieves a sufficient cooling airflow in both lift and cruise configurations.

Figure 2B:
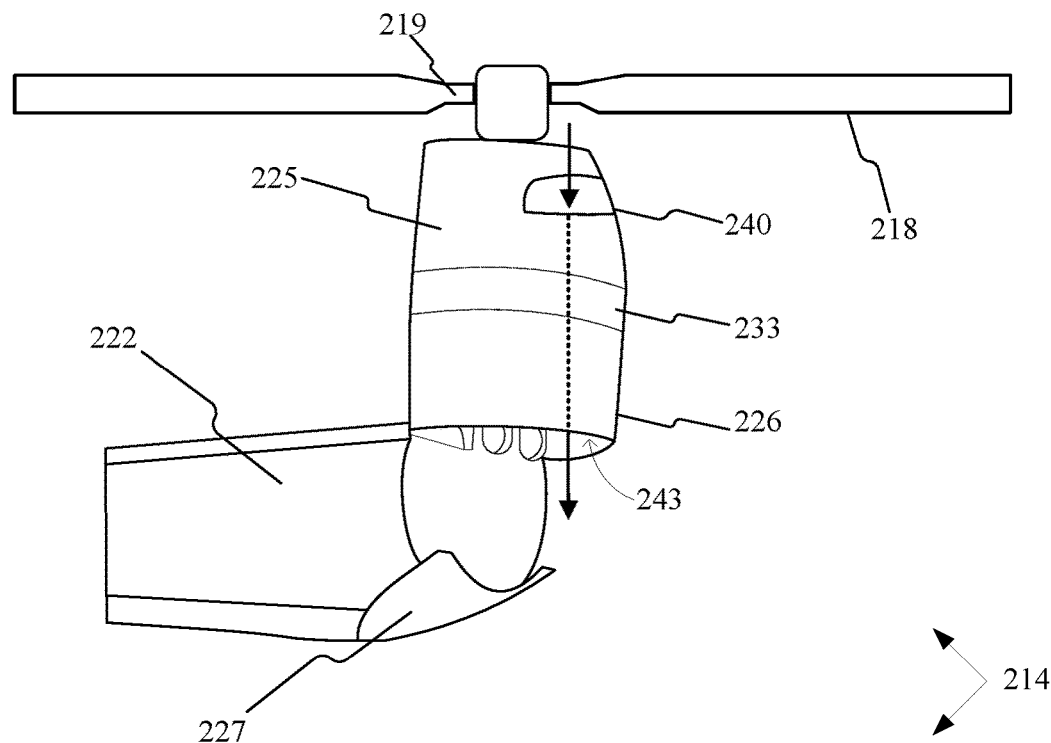
Figure 2B:
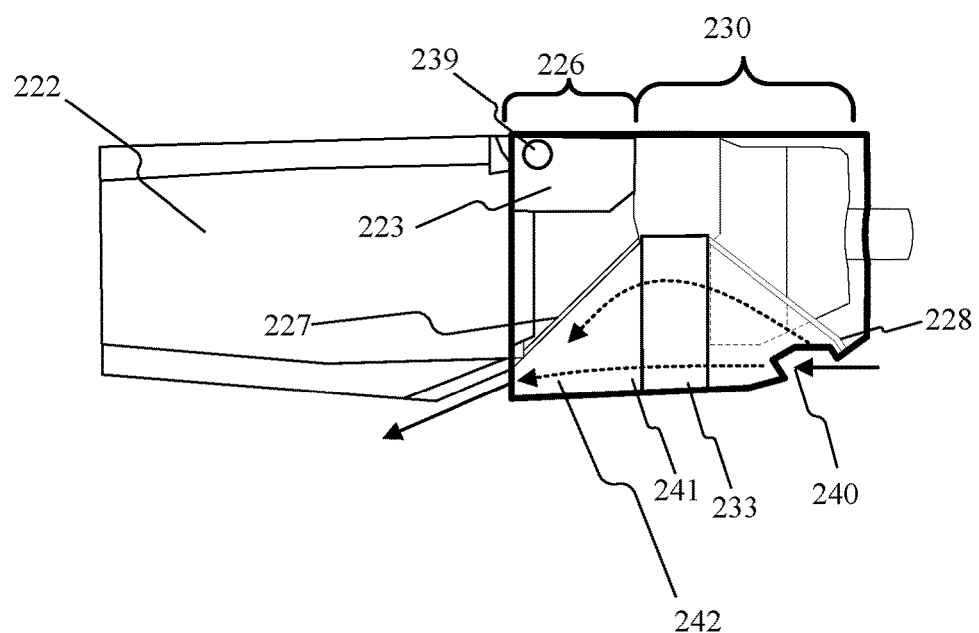

FIG. 2B illustrates a further tilt propeller 214 in lift and cruise configurations, consistent with embodiments of the present disclosure. In FIG. 2B, extending portion 226 is not divided into full and partial sections, but instead substantially surrounds the entire rotational axis along its full depth. This configuration may be advantageous to generate a wider wake region 243 by shielding a larger volume of space from the strong propwash of blades 218.

In some embodiments, heat exchanger 233 may be larger than what is depicted in FIG. 2A. For example, at the top of FIG. 2B, heat exchanger 233 may have an arc length that is commensurate with the increased size of wake region 243. In some embodiments, as shown at bottom in FIG. 2B, boom baffle 227 may be configured to include the entire heat exchanger 233 within exhaust channel 242. Alternatively, boom baffle 227 may be configured to enclose only a portion of heat exchanger 233 in order to maintain a narrow exhaust channel 242 similar to FIG. 2A, or heat exchanger 233 may be the same size as shown in FIG. 2A despite the larger extending portion 226. Similarly, nacelle baffle 228 may at least partially wrap around motor assembly 230 in order to enclose all of heat exchanger 233 within exhaust channel 241.

In some embodiments, to accommodate a 360° extending portion 226 in the cruise configuration, motor assembly may be spaced apart from boom 222 by extension mount 223. Extension mount 223 may space motor assembly 230 away from boom 222 by a distance that is slightly less than a depth of extending portion 226. This may allow for a slight overlap of nacelle 226 over boom 222 when operating in the cruise configuration. Alternatively, extension mount may space motor assembly 230 away from boom 222 by a distance that is substantially equal to the depth of extending portion 226.

Figure 2C:
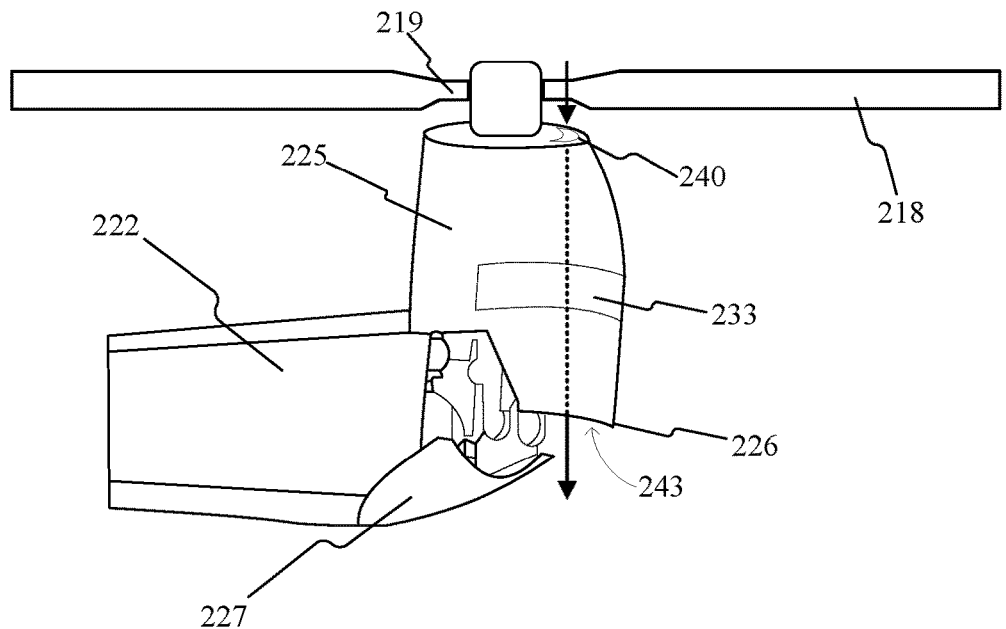
Figure 2C:
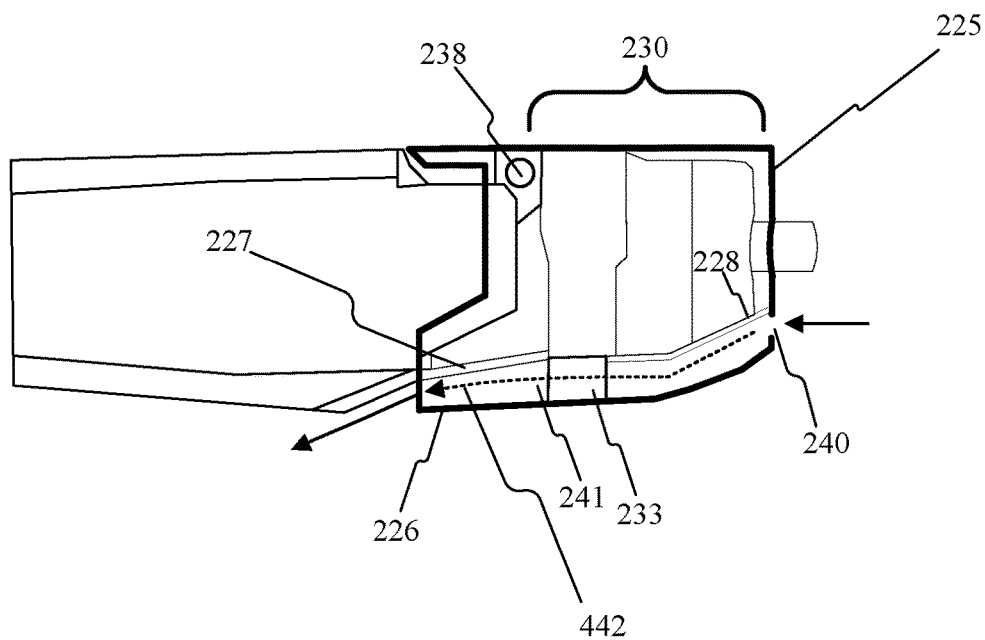

FIG. 2C illustrates a further tilt propeller 214 in lift and cruise configurations, consistent with embodiments of the present disclosure. FIG. 2C differs from FIG. 2A in that an air inlet 240 is located in the top of nacelle 225 facing toward propeller blades 218 or blade roots 219 rather than on a side of nacelle 225. Configuring air inlet 240 closer to propeller blades 218 may yield improved air flow. Furthermore, as explained above with respect to FIG. 2A, air inlet 240 need not have the arcuate shape depicted in FIG. 2B, but may comprise any number of different shapes, sizes, or other configurations.

Figure 2D:
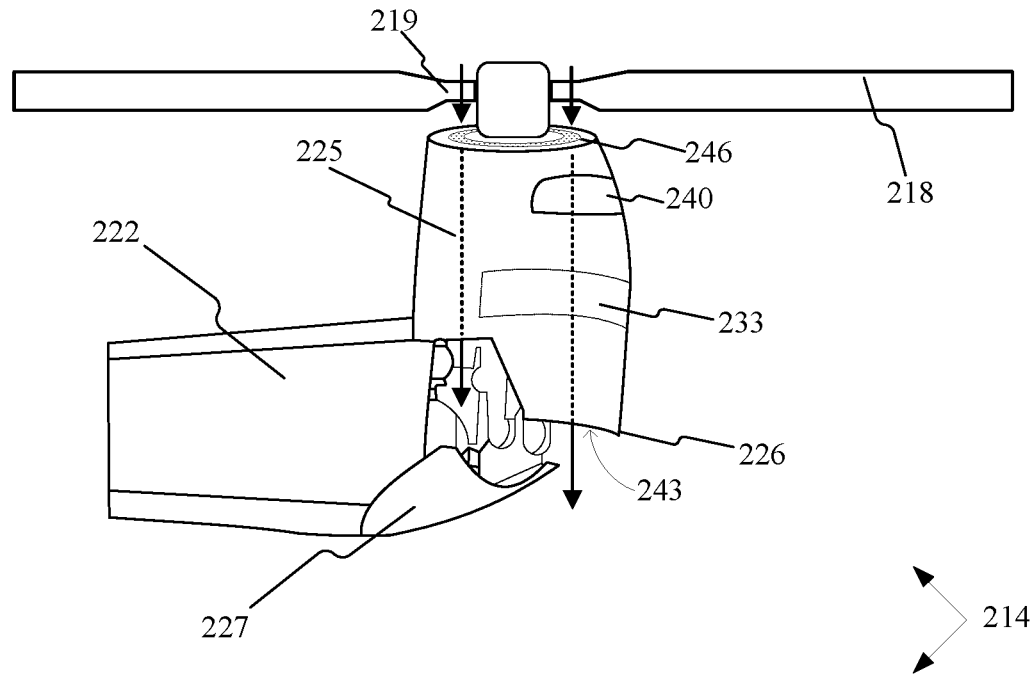
Figure 2D:
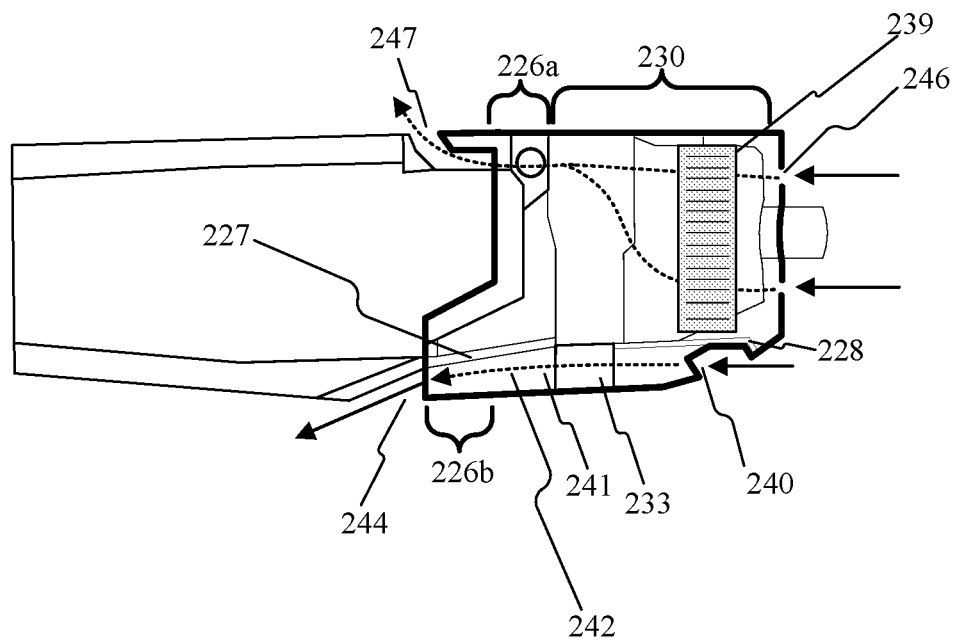

For instance, FIG. 2D illustrates a further tilt propeller 214 in lift and cruise configurations, consistent with embodiments of the present disclosure, comprising a further annular air inlet 246 around hub 231. Annular air inlet 246 may allow for a better distribution of cooling air over motor assembly 230. As seen at bottom in FIG. 2D, exhaust channel 242 may direct airflow on a first cooling path through heat exchanger 233 before exiting through exhaust outlet 244. Meanwhile, cooling airflow may also be directed on a second cooling path through annular air inlet 246 to cooling fins 239 and out through a second exhaust outlet 247. Therefore, multiple heat generating locations may be targeted by the cooling airflow to cool motor assembly 230 more efficiently. For example, cooling fins 239 may encircle an outside surface of motor assembly 230 so that the entire annular airflow from air inlet 240 passes through cooling fins 239 before exiting at second exhaust outlet 247.

In some embodiments, annular air inlet 246 may be used in lieu of air inlet 240 rather than in addition to it. The annular shape may allow for a larger inlet size to allow more air into nacelle 225. Further, the annular shape may distribute the opening area over a greater distance, so that the surface area of air inlet 240 may be better distributed. For instance, configuring air inlet 240 with an annular shape may offer optimal placement of the opening in relation to both blades 218 and motor assembly 230. At positions near hub 231, even slight differences in the radial distance of air inlet 240 could make a measurable difference in airflow from the propwash of blades 218. By distributing the air inlet 240 around hub 231, a greater portion of the opening area can be located at the best radial distance as compared to, e.g., the embodiment of FIG. 2C.

Figure 2E:
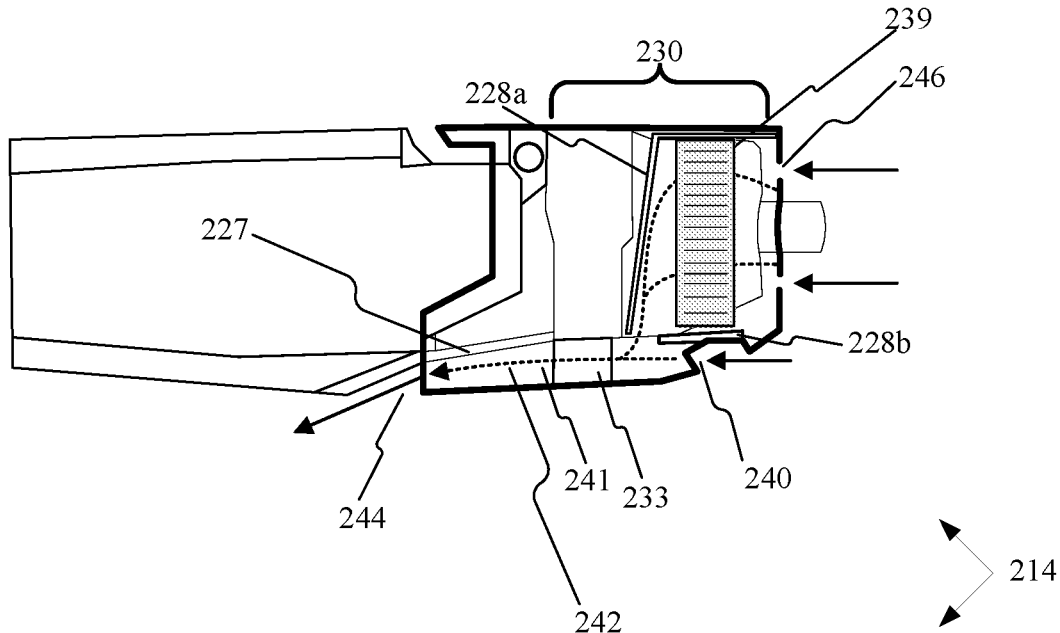
Figure 2E:
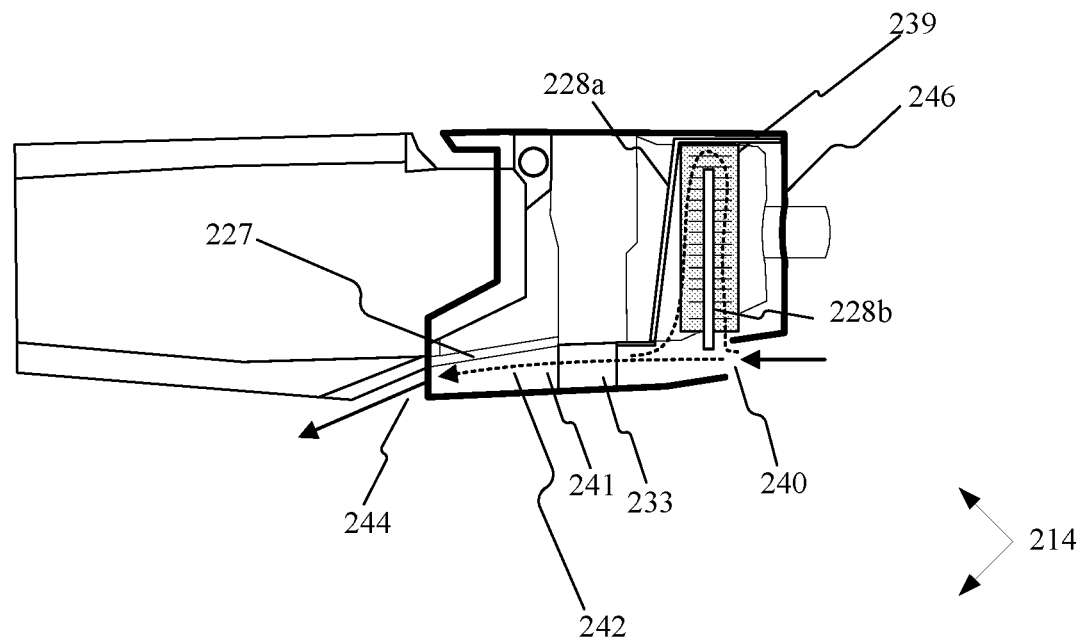

FIG. 2E illustrates further baffle arrangements for alternative flow paths in the cruise configuration of tilt propellers 214, consistent with embodiments of the present disclosure. The top of FIG. 2E shows a variant of FIG. 2D in which the second cooling path from annular air inlet 246 is merged with the first cooling path at exhaust channel 241. In the embodiment at the top of FIG. 2E, Nacelle 225 may comprise multiple baffle portions 228. For example, a first nacelle baffle 228a may direct air from cooling fins 239 to an inlet side of heat exchanger 233. A second nacelle baffle 228b may direct air from air inlet 240 along exhaust channel 242 to heat exchanger 233. In this configuration, airflow from multiple portions of motor assembly 233 may be exhausted through a single exhaust outlet 244. Further, heat exchanger 233 may receive a larger flow of cooling air by feeding it air from the second cooling path as well as the first cooling path.

The bottom of FIG. 2E shows a further arrangement of two cooling paths. In this case, a first nacelle baffle may be arranged similar to what is shown at the top of FIG. 2E, but there may be no annular air inlet 246. Instead all airflow may enter through air inlet 240, shown here configured as a scoop, and be bifurcated by second nacelle baffle 228b. A first cooling path may follow along exhaust channel 242 as discussed above. A second cooling path may be formed by first and second nacelle baffles 228a and 228b. The second cooling path may comprise a tortuous path along cooling fins 239 to increase the thermal contact with the air.

Figure 2F:
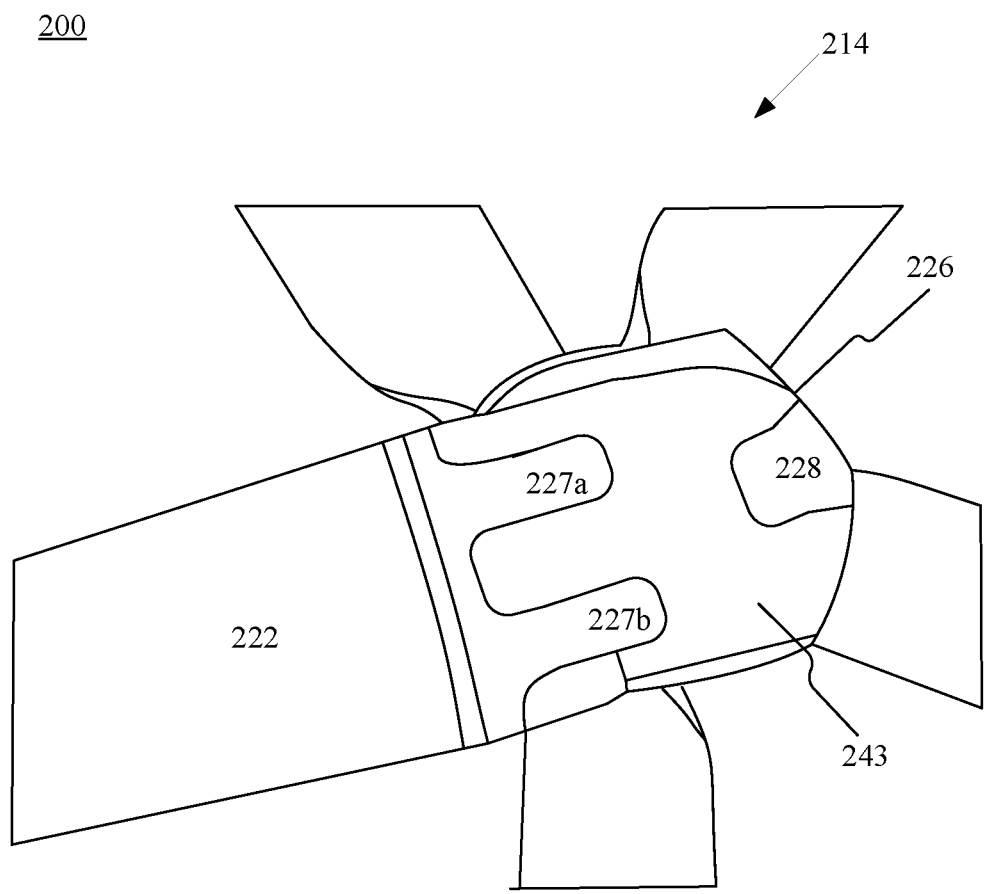

In some embodiments, nacelle baffle 228 and boom baffle 227 may comprise complimentary shapes such as, e.g, tooth-like segments of a contiguous baffle surface. FIG. 2F is a view from below tilt propeller 214 illustrating such a segmented baffle structure, consistent with embodiments of the present disclosure Here, the element corresponding to boom baffle 227 in FIGS. 2A-E may, as shown in FIG. 2F, comprise a first segment 227a and a second segment 227b of a multi-segment boom baffle structure. Nacelle baffle 228 may be formed on the interior surface of nacelle 225 as a further segment to complete exhaust channel 242 from air inlet 240 to exhaust outlet 244. Nacelle baffle 228 may be shaped to unite with first and second boom baffle segments 227a and 227b when operating in the cruise configuration. When tilting to the lift configuration, nacelle baffle 228 may separate from the first and second boom baffle segments 227a and 227b to leave air outlet 241 exposed to a wake region 243. In some embodiments, as further discussed below with respect to FIG. 2G, nacelle baffle 228 may comprise apertures configured to couple a region on the air inlet side of nacelle baffle segment 228 with the wake region 243 on the opposite side. Thus in the lift configuration, the baffle segments may separate from each other to better expose a central portion of wake region 243. Because a central area between segments 227a and 227b is removed in the lift configuration, airflow may pass through nacelle 225 without obstruction from a protruding baffle.

Figure 2G:
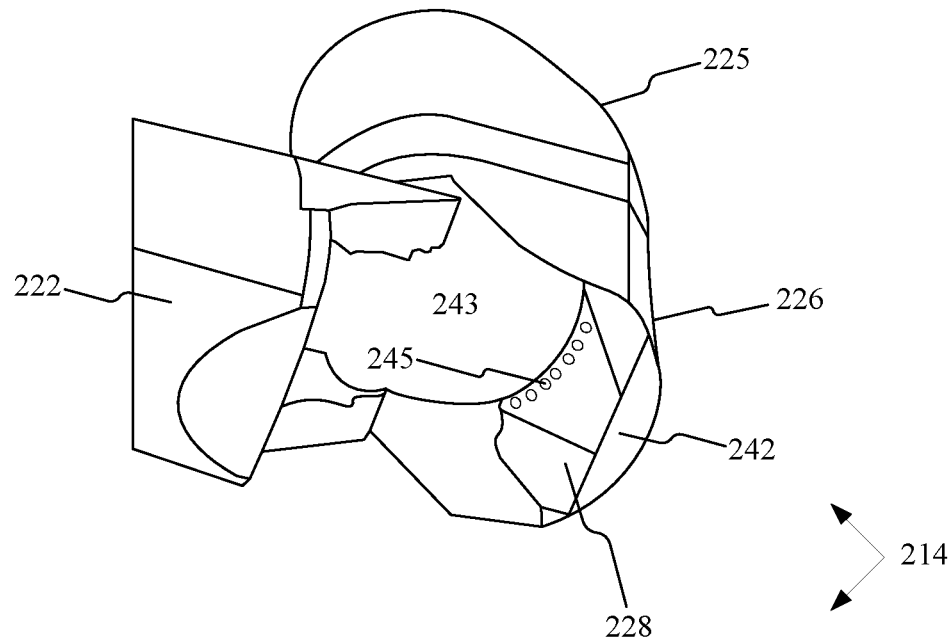
Figure 2G:
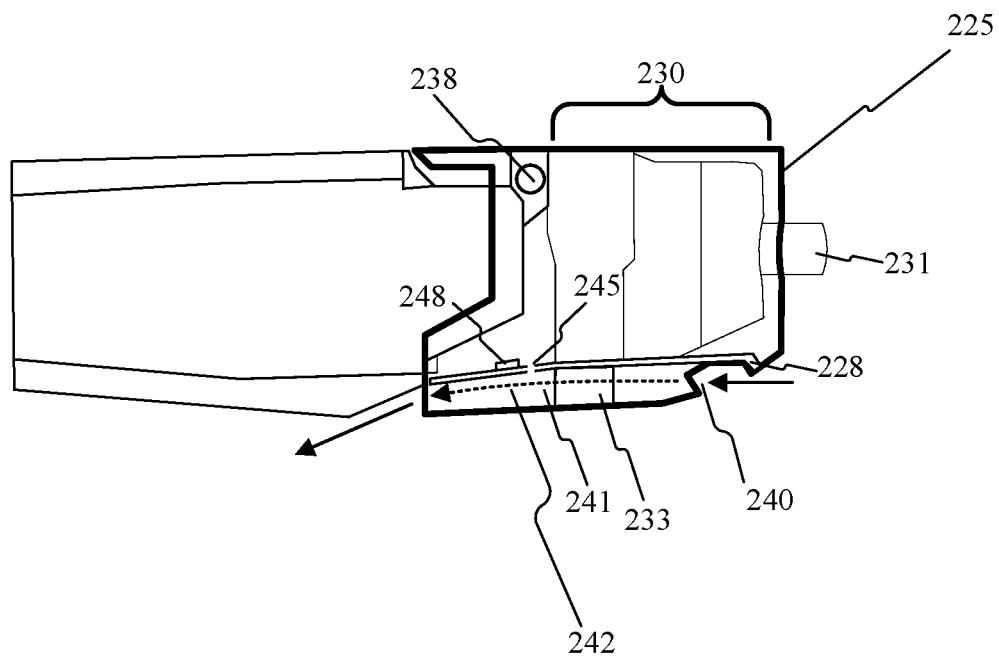

FIG. 2G illustrates a further tilt propeller 214 in lift and cruise configurations, consistent with embodiments of the present disclosure. As shown in FIG. 2G, the entire baffle may be mounted to the inside of nacelle 225. In such a case, the exhaust channel may be formed in both the lift configuration and the cruise configuration. In some embodiments, nacelle baffle 228 may comprise apertures to couple a region within exhaust channel 242 to wake region 243 outside exhaust channel 242. This may allow air to be drawn into exhaust channel 242 from air inlet 240 due to the low-pressure zone in wake region 243. The apertures may have a sufficient size, shape, number and placement to achieve this coupling effect in the lift configuration while still directing sufficient airflow through the exhaust channel when operating in the cruise configuration. Alternatively, the apertures may comprise covers that may be actuated passively or actively so that they are open in the lift configuration and closed in the cruise configuration. For example, in some embodiments nacelle 225 may comprise a sliding cover 248 (as seen at bottom in FIG. 2G) that moves in concert with the tilting of tilt actuator 238. The sliding cover may expose apertures 245 in the lift configuration. Upon tilting to a cruise configuration, the sliding cover may slide over apertures 245 to close them off and seal exhaust channel 242.

Figure 2H:
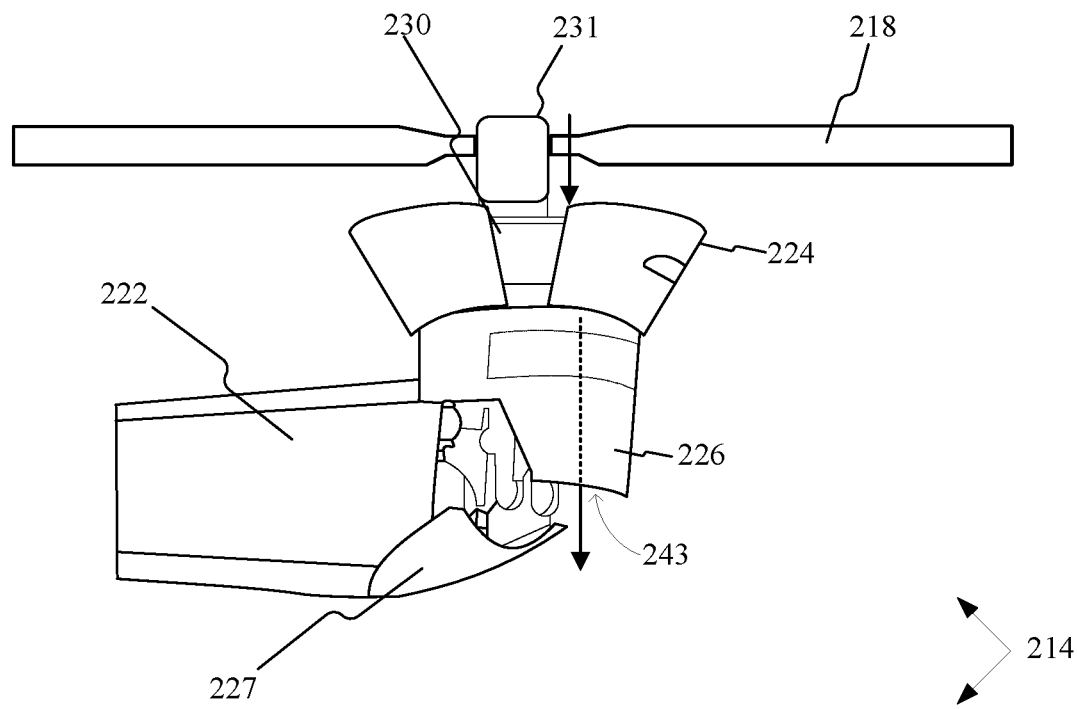
Figure 2H:
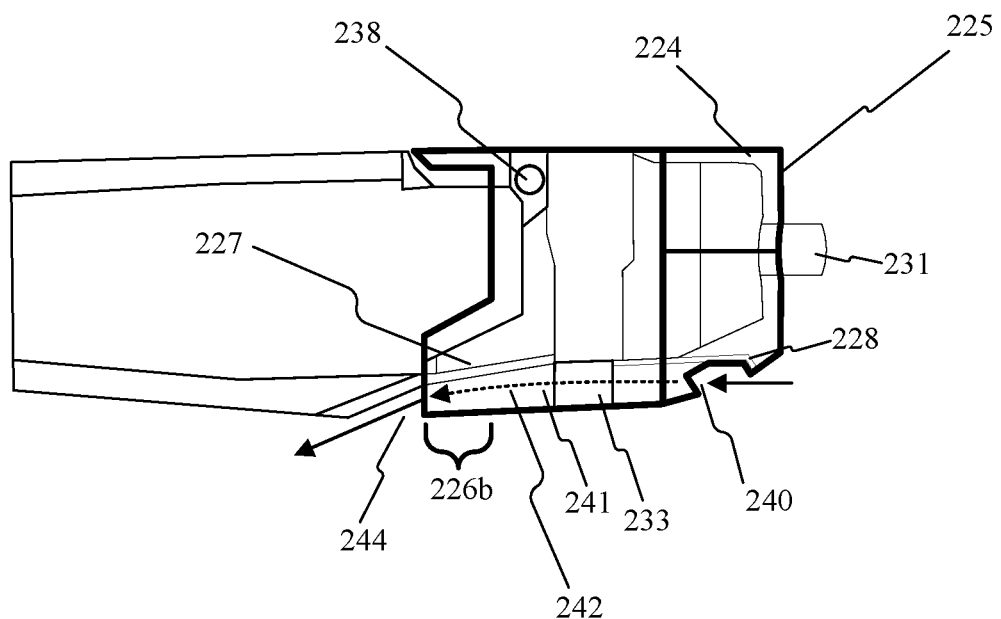

Further, other components of nacelle 225 may be actuated to optimize airflow. FIG. 2H illustrates a further tilt propeller 214 in lift and cruise configurations, consistent with embodiments of the present disclosure. The top of nacelle 245 may comprise clamshell segments 224 configured to open in the lift configuration. For example, the segments may be actuated by a mechanically coupling to tilt actuator 238. When open, clamshell segments 224 may create a funnel or other opening to direct a larger amount of airflow into nacelle 225. When tilting back to the cruise configuration, clamshell segments may be configured form a streamlined nacelle 225.

Although the clamshell segments 224 are shown with a gap between them in the lift configuration, this is not necessarily so. Clamshell segments may be configured to overlap each other so that they form a continuous funnel or other aperture shape. In some embodiments there may be as few as one clamshell segment. For instance, clamshell segment 224 may comprise a louver-type door configured to open in the lift configuration and close in the cruise configuration.

Figure 2I:
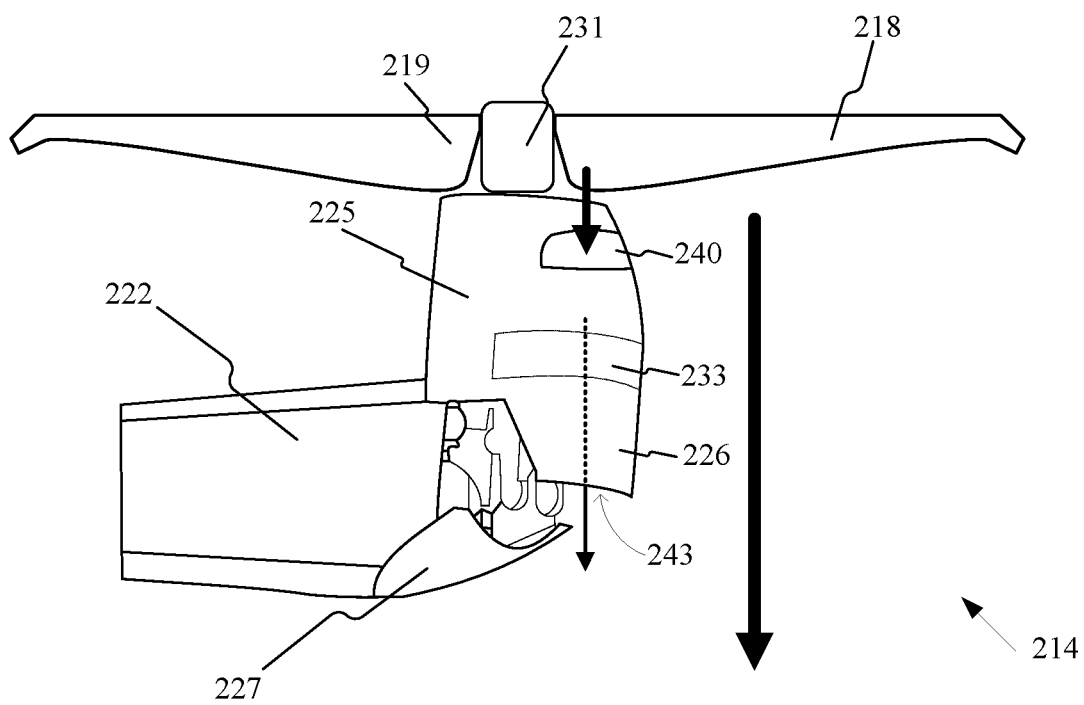

Further, while blades 218 have been depicted as being narrower at blade root 219 in FIGS. 2A-H, blades 218 may take other forms. For example, as shown in FIG. 2I, blades 218 may be, e.g., wider at root 219 than they are at a peripheral region. This design may additionally provide better airflow during lift by increasing the propwash strength near hub 231. In some embodiments, a profile of blade 218 may be chosen so that the wide portion of root 219 is located over air inlet 240.

While certain features of FIGS. 2A-I may be depicted with respect to one embodiment, or fewer than all embodiments, it should be appreciated that other combinations of the various disclosed features are contemplated within the scope of the present disclosure, as would be understood by persons having ordinary skill in the art. For example, the various embodiments of air inlets 240, baffles 227-228, heat exchangers 233 and extending portions 226 may be combined with each other in numerous ways, for example to achieve the various advantages of the different configurations of each component.

B. Example Motor Assembly Embodiments

FIGS. 3A-B illustrate example closeup views of a tilt motor assembly 330 in a VTOL aircraft, consistent with embodiments of the present disclosure. Motor assembly 330 may be similar to, e.g., motor assembly 230 of FIGS. 2A-I. Elements in FIGS. 3A-B that are similar to those in FIGS. 1-2I may be labeled with corresponding numbers, using 3 as the leading digit. For example, in some embodiments, thermal transfer device 333 of FIG. 3A may be similar to heat exchanger 233 of FIG. 2A.

Motor assembly 330 may be mounted to a boom (such as boom 222 in FIGS. 2A-F). Motor assembly 330 may further be coupled to a hub and blades of a tilt propeller (such as tilt propeller 214 in FIGS. 2A-I) via shaft 332. Motor assembly 330 may be configured to rotate the shaft 332 at variable speeds to generate forward thrust at a tilt propeller in a cruise configuration of a VTOL aircraft 300 (for example, as seen in FIG. 1A). Motor assembly 330 may be further configured to generate vertical thrust at the tilt propeller in a lift configuration during a lift phase of the VTOL aircraft (for example, as seen in FIG. 1B). Motor assembly 330 may comprise, e.g., a motor 335, gearbox 336, and inverter 337 (illustrated by dashed boxes). Motor assembly 326 may further comprise an enclosure 326 around motor 335, gearbox 336, and inverter 337. Motor assembly 330 may further comprise a heat transfer device 333 placed outside the enclosure 326 to thermally couple the components 335-337 of motor assembly 330 to, e.g., a cooling airflow. For example, heat transfer device 333 may comprise a heat exchanger. In some embodiments as shown in FIG. 3B, motor assembly 330 may comprise a second heat transfer device 339, alternatively or in addition to heat transfer device 333. In some embodiments, the second heat transfer device 339 may comprise cooling fins. In some embodiments, heat transfer device 333 may be coupled to enclosure 326 near inverter 337 at a lower portion of motor assembly 330. In some embodiments, portions of heat exchanger 333 or cooling fins 339 may extend inside enclosure 326 in a way that maintains a substantial seal against outside air.

It should be understood that the spatial relationships among different components of motor assembly 330 as shown in FIGS. 3A-B are given by way of example, and need not always be arranged in this way. For example, in some embodiments, gearbox 336 may not be located below motor 335, and neither component may necessarily be located above or below the other. In general, the various components of motor assembly 330 may be arranged in a plurality of configurations as would be understood by those of ordinary skill in the art. Furthermore, motor assembly may comprise additional components, or may omit one or more components discussed herein.

Further, not all components need be arranged symmetrically. For example, motor 335 and gearbox 336 may be configured to share a same longitudinal axis. For instance, the longitudinal axis may correspond to an axis of rotation of their associated propeller. Meanwhile, inverter 337 may not share a longitudinal axis with motor 335 and gearbox 336. For example, inverter 337 may be arranged offset from other components of motor assembly 330, or placed on a side of motor assembly 330 (as seen, for example, in FIG. 4C). In general, inverter 337 may be placed in any suitable arrangement within enclosure 326.

Additionally, motor assembly 330 may comprise redundancies to ensure proper operation in the event of failure of one or more components. For example, motor 335 may comprise a rotor surrounded by multiple redundant stators. The multiple stators may be configured to operate simultaneously in conjunction with one another, as well as operating on their own in the event of a failure. Similarly, inverter 337 may comprise multiple stages. In some embodiments, inverter 337 may comprise a dual stage inverter, or may comprise more than two stages.

Heat exchanger 333 may be configured to receive a circulating heat exchange medium from the interior of motor assembly 330. For example, the heat exchange medium may comprise oil, and the oil may be used to both lubricate and cool the components of motor assembly 330. The oil may circulate through a lubricating heat-exchange flow path that includes one or more components of motor assembly 330, such as motor 335, gearbox 336, inverter 337, and heat exchanger 333. The lubricating heat-exchange flow path may be advantageously minimized by locating heat exchanger 333 adjacent to enclosure 326, thereby minimizing the volume (and weight) of material required to achieve the cooling and lubricating functions. Further, the lubricating heat-exchange flow path may reduce the need for hoses, connections and other elements that may add complexity and weight, and increase the risk of failure. Motor assembly 330 may thus comprise a substantially sealed, oil-cooled or hybrid-cooled system configured to target one or more heat-generating portions of motor assembly 330, as further described below with respect to FIGS. 4A-E.

Enclosure 326 may comprise a substantially form-fitting casing around the components 335-337 of motor assembly 330. Enclosure 326 may prevent dust, debris or other pollutants contained in a cooling airflow from negatively impacting the components 335-337. Enclosure 326 may comprise a motor enclosure 327, dividing plate 328, and inverter enclosure or controller enclosure 329.

Motor enclosure 327 may surround and seal upper components of motor assembly 330, such as motor 335 and gearbox 336. A coolant, such as oil, may circulate through motor enclosure 327 to lubricate and cool the components of motor 335 and gearbox 336. A lower face of motor enclosure 327 may be sealed by dividing plate 328. For example, dividing plate 328 may comprise an end bell plate that serves to close off motor enclosure 327.

Inverter enclosure 329 may surround and seal lower components of motor assembly 330, such as inverter 337. Inverter 337 may comprise, e.g., electronic circuit boards and other control components configured to control the operation of motor assembly 330. Therefore, inverter 337 may comprise a tilt propeller controller and inverter enclosure 329 may alternatively be referred to as a controller enclosure 329. Controller enclosure 329 may be isolated from the oil or other coolant of motor enclosure by dividing plate 328. For example, dividing plate 328 may comprise a thermal plate that serves to close off controller enclosure 329 and thermally couple it to the oil or other coolant.

Dividing plate 328 may comprise one or more plates sandwiched together and arranged between motor enclosure 327 and controller enclosure 329. For example, in some embodiments, dividing plate 328 may comprise an end bell and thermal plate as discussed above, sandwiched together between the motor and controller enclosures 327 and 329. Dividing plate 328 may isolate the interior spaces of motor and controller enclosures 327 and 329 from each other as well as from the external environment outside of enclosure 326. In some embodiments, one or more of the sandwiched plates of dividing plate 328 may comprise grooves, bores, or other conduits configured to distribute the oil or other coolant in a planar direction of dividing plate 328.

In some embodiments, dividing plate 328 may comprise an integral mounting bracket for supporting heat exchanger 333. Heat exchanger 333 may comprise, e.g., a folded fin or other type of heat exchanger. The oil or other coolant which has been heated by the motor 335, gearbox 336, or inverter 337, may be circulated through the fins of heat exchanger 333 by an internal conduit of heat exchanger 333. An inlet and outlet for the internal conduit may be coupled to an outlet and inlet, respectively, of the bores or grooves of dividing plate 328. In this way, heated oil (or other coolant) may carry heat from enclosure 326 to the fins of heat exchanger 333 where the heat may be passed to a cooling airflow that travels through the fins. Therefore, the entire motor assembly may be efficiently cooled without exposing sensitive components to the external environment.

Motor enclosure 327, dividing plate 328, and inverter enclosure 329 may be formed of, e.g., a lightweight and rigid material having high thermal conductivity. For example, the material may comprise metals such as aluminum or copper, ceramics such as silicon carbide, or another suitable material.

C. Example Coolant and Airflow Path Embodiments

FIGS. 4A-E provide schematic illustrations of example oil and airflow paths in a motor assembly 530 and surrounding areas of a VTOL aircraft, consistent with embodiments of the present disclosure. The VTOL aircraft may be similar to, e.g., VTOL aircraft 100 of FIGS. 1A-B or VTOL aircraft 200 of FIGS. 2A-I. Motor assembly 530 may be similar to, e.g., motor assemblies 230 or 330 of FIGS. 2A-3B. Elements in FIGS. 4A-E that are similar to those in FIGS. 1-3B may be labeled with corresponding numbers, using 4 as the leading digit. For example, in some embodiments, air inlet 440 of FIG. 4A may be similar to air inlet 240 of FIG. 2A. The solid arrow lines in FIGS. 4A-E may represent oil (or other heat exchange medium) flow paths, while the dashed arrow lines may represent cooling airflow paths.

Figure 4A:
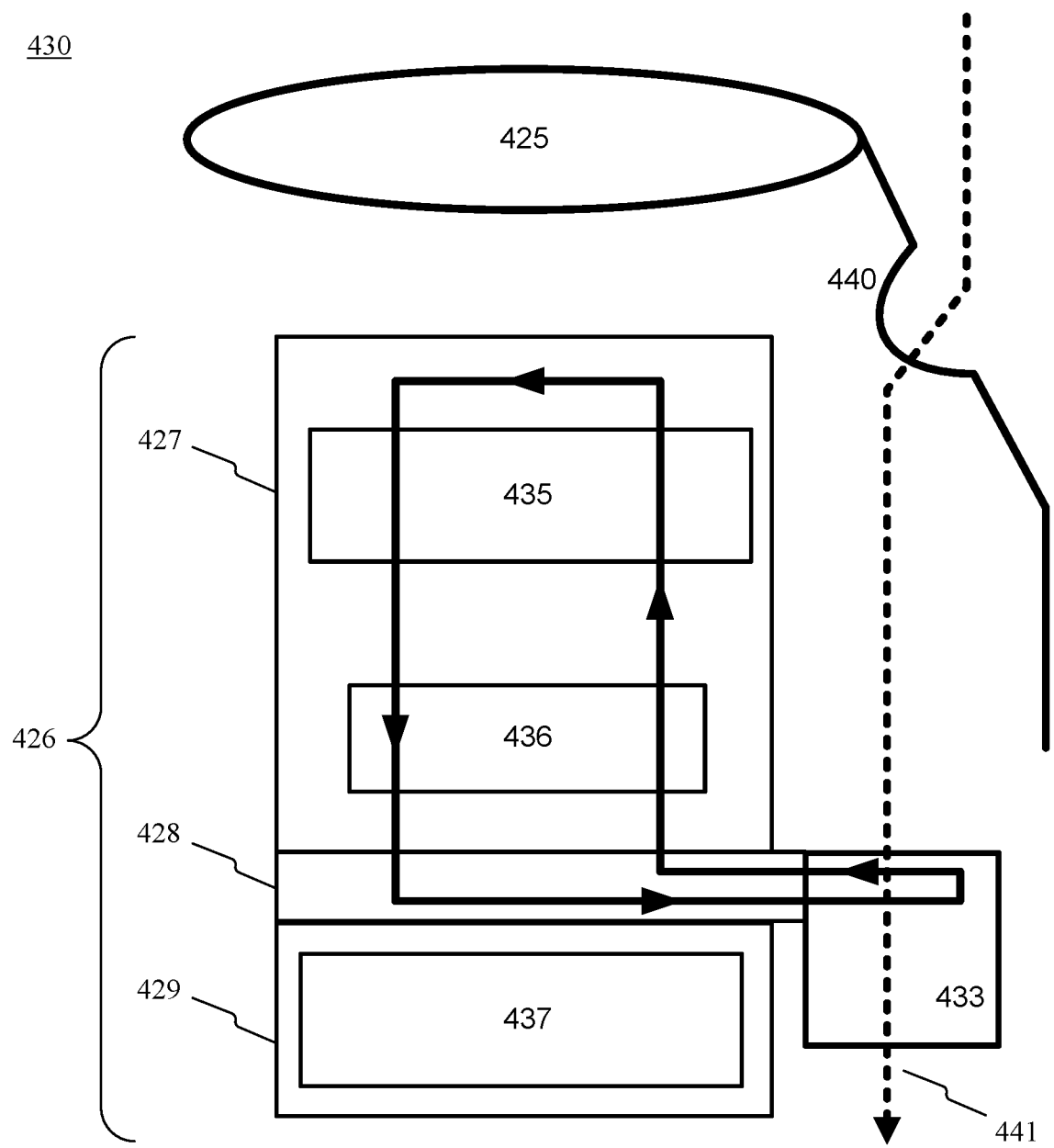

FIG. 4A schematically depicts a motor assembly 430 and surrounding elements of a VTOL aircraft, consistent with embodiments of the present disclosure. Motor assembly 430 may comprise components such as motor 435, gearbox 436, and inverter 437 housed within enclosure 426. Enclosure 426 may comprise motor enclosure 427, dividing plate 428, and controller enclosure 429. Motor enclosure 427 may surround and seal components such as motor 435 and gearbox 436. Controller enclosure 429 may surround and seal inverter 437. Motor assembly 430 may further comprise heat exchanger 433 thermally coupled to the components 435-437 by way of a lubricating heat-exchange oil flow path (indicated by solid lines). In some embodiments, heat exchanger 433 may be supported by a mounting bracket or other extension of dividing plate 428. Dividing plate 428 may extend beyond the motor and controller enclosures 427/429 so that dividing plate 428 may both support heat exchanger 433 and seal the motor and controller enclosures 427 and 429. Dividing plate 428 may further comprise bores, grooves or other conduits to circulate oil (or other coolant) from motor enclosure 427 into heat exchanger 433. Dividing plate 428 may further thermally couple controller enclosure 429 to the oil by thermal conduction. Thus, the lubricating heat-exchange oil flow path may lubricate the components 435-437 and/or absorb heat generated by the components. Heat absorbed by the oil may be carried to heat exchanger 433 where it may be transferred to incoming air (indicated by dashed lines). For example, the air may pass through fins or other pathways in heat exchanger 433. The fins or other pathways may be configured to maximize the surface contact area between the heat exchanger and the air flow while maintaining acceptable limits of air pressure drop across the heat exchanger. Air flow may enter nacelle 425 by air inlet 440. The airflow may be drawn into air inlet 440 due to a low pressure zone at an air outlet 441 side of heat exchanger 433. For example, the low pressure zone may comprise a wake region generated by propwash flowing past the outside nacelle 425. Nacelle 425 may comprise an extending portion (not shown) configured to increase the size of the wake region to create a pressure differential between air inlet 440 and outlet 441. In some embodiments, the air may further be forced into air inlet 440 as propwash from a region of propeller blades near air inlet 440. Air may exit the heat exchanger 433 and leave nacelle 425 by air outlet 441 without entering or passing through enclosure 426.

The lubricating heat-exchange oil flow path is illustrated with a high level of generality as a simple loop. However, it should be understood that the oil flow path may comprise branches, sub-loops or other segmented paths. In general, the oil may be circulated in any way that effectively lubricates and cools various components of motor assembly 430. Further, other elements are illustrated in highly schematic form. For example, inlet 440 is depicted as a cutout in nacelle 425. However, it should be understood that air inlet 440 can take any suitable form or location, including any of those disclosed with respect to air inlets 240 or 246 in FIGS. 2A-I.

Figure 4B:
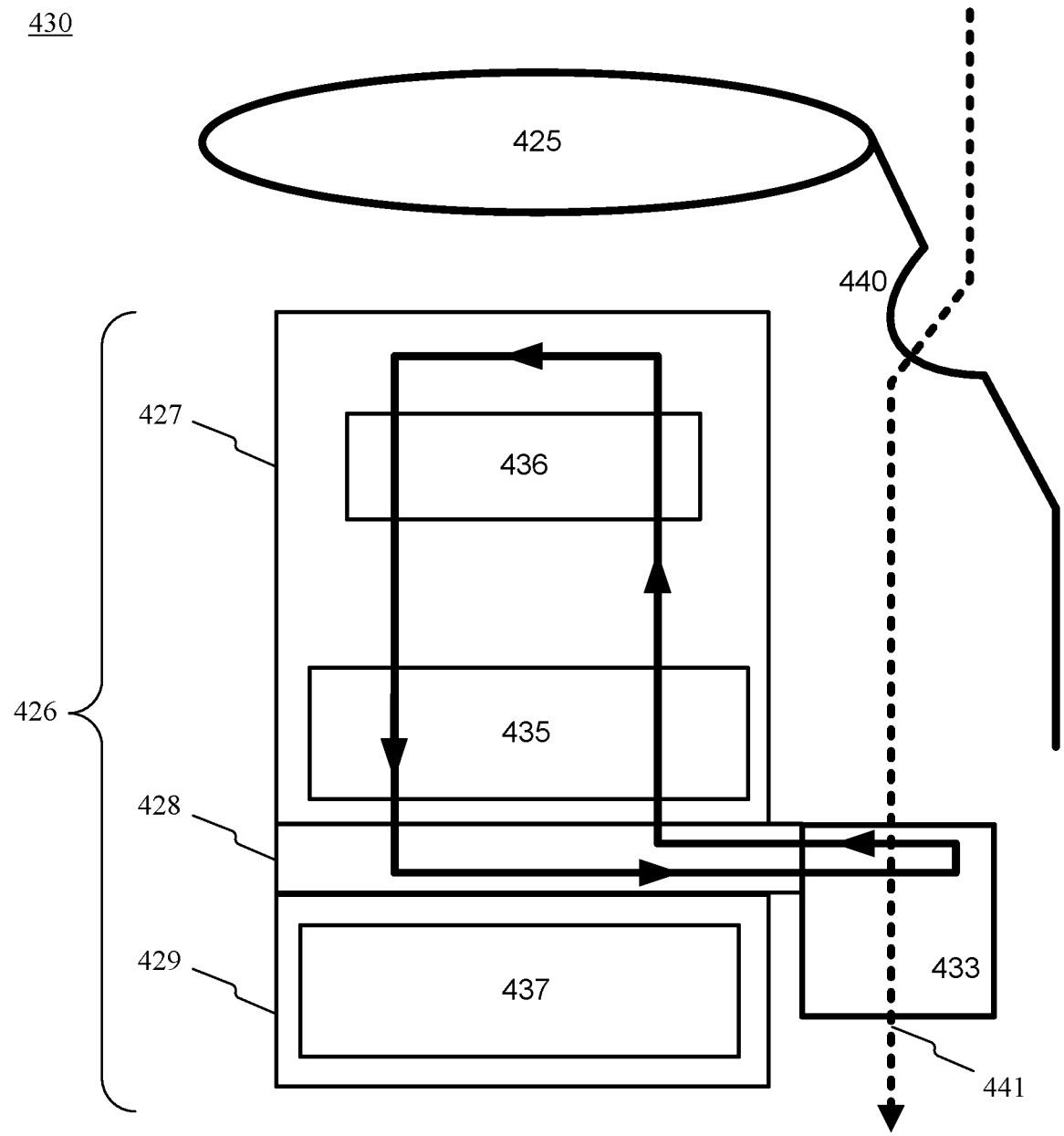

FIG. 4B schematically depicts a motor assembly 430 and surrounding elements of a VTOL aircraft, consistent with embodiments of the present disclosure. The embodiment of FIG. 4B may be similar to that of FIG. 4A with the exception of the relative positions of gearbox 436 and motor 435. Gearbox 436 may instead be located above motor 435, however, gearbox 436 and motor 435 may retain their axial alignment. The oil flow path of FIG. 4B may operate in an analogous manner to both lubricate and cool the motor 435 and gearbox 436.

Figure 4C:
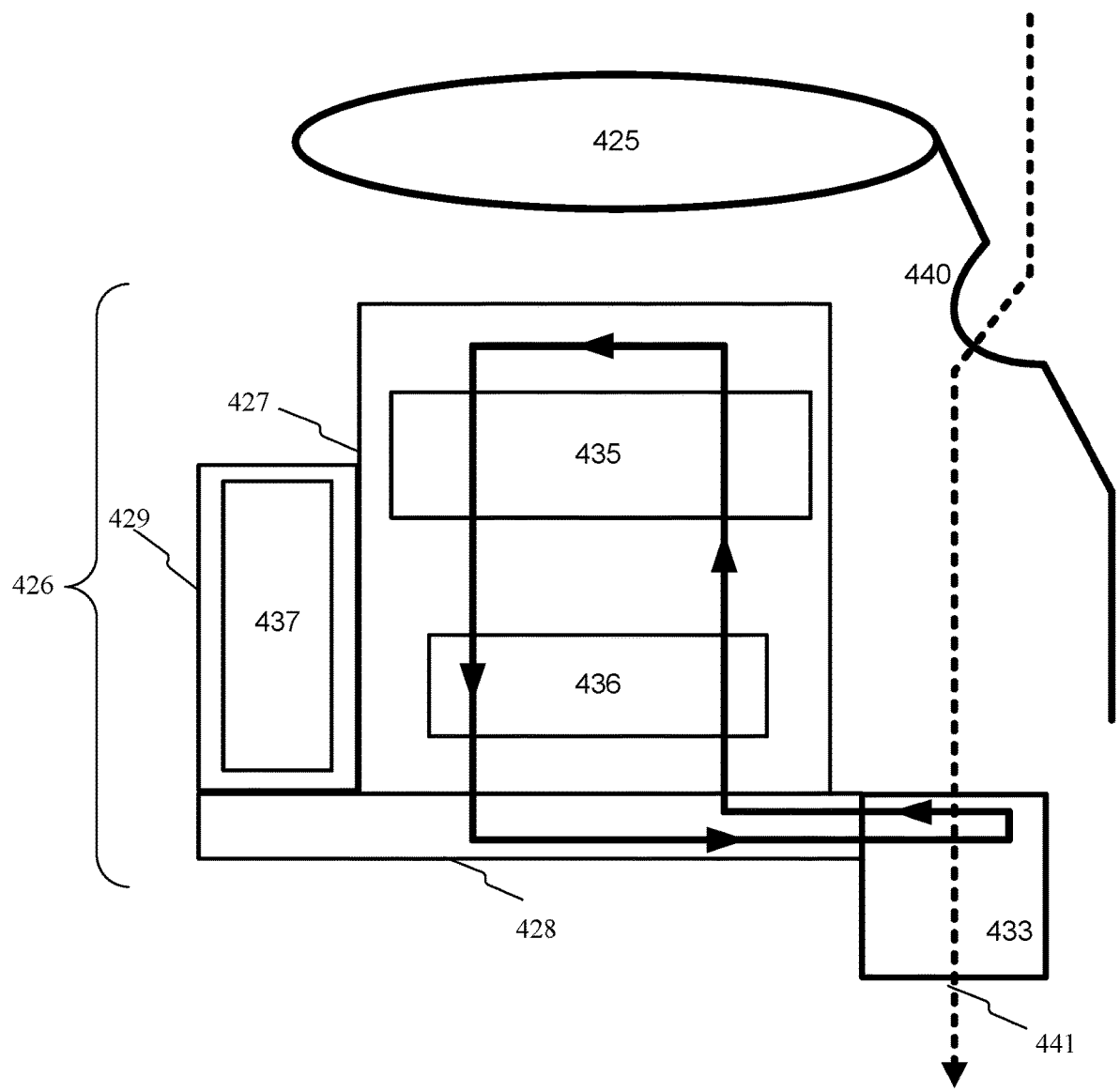

FIG. 4C schematically depicts a motor assembly 430 and surrounding elements of a VTOL aircraft, consistent with embodiments of the present disclosure. The embodiment of FIG. 4C may be similar to that of FIG. 4A with the exception of the arrangements of inverter 437 and dividing plate 428. Because inverter 437 does not have the same mechanical alignment constraints as motor 435 and gearbox 436, the arrangement of inverter 437 may be allowed more design freedom. For example, as seen in FIG. 4C, inverter 437 may be laterally displaced from motor 435 and gearbox 436 and mounted on a side of motor enclosure 427. Further, dividing plate 428 may extend to meet inverter 437 as shown. In some embodiments, dividing plate 428 may be oriented vertically and placed between controller enclosure 429 and motor enclosure 427. Alternatively or additionally, dividing plate may comprise a plurality of dividing plates that run along the bottom of controller enclosure 429 as well as between controller enclosure 429 and motor enclosure 427. In some embodiments, dividing pate may achieve this same arrangement by taking a complex shape such as a "T" or "L" shape. Thus, the oil flow path of FIG. 4C may thermally couple to all components of motor assembly 430 even in their rearranged form.

Figure 4D:
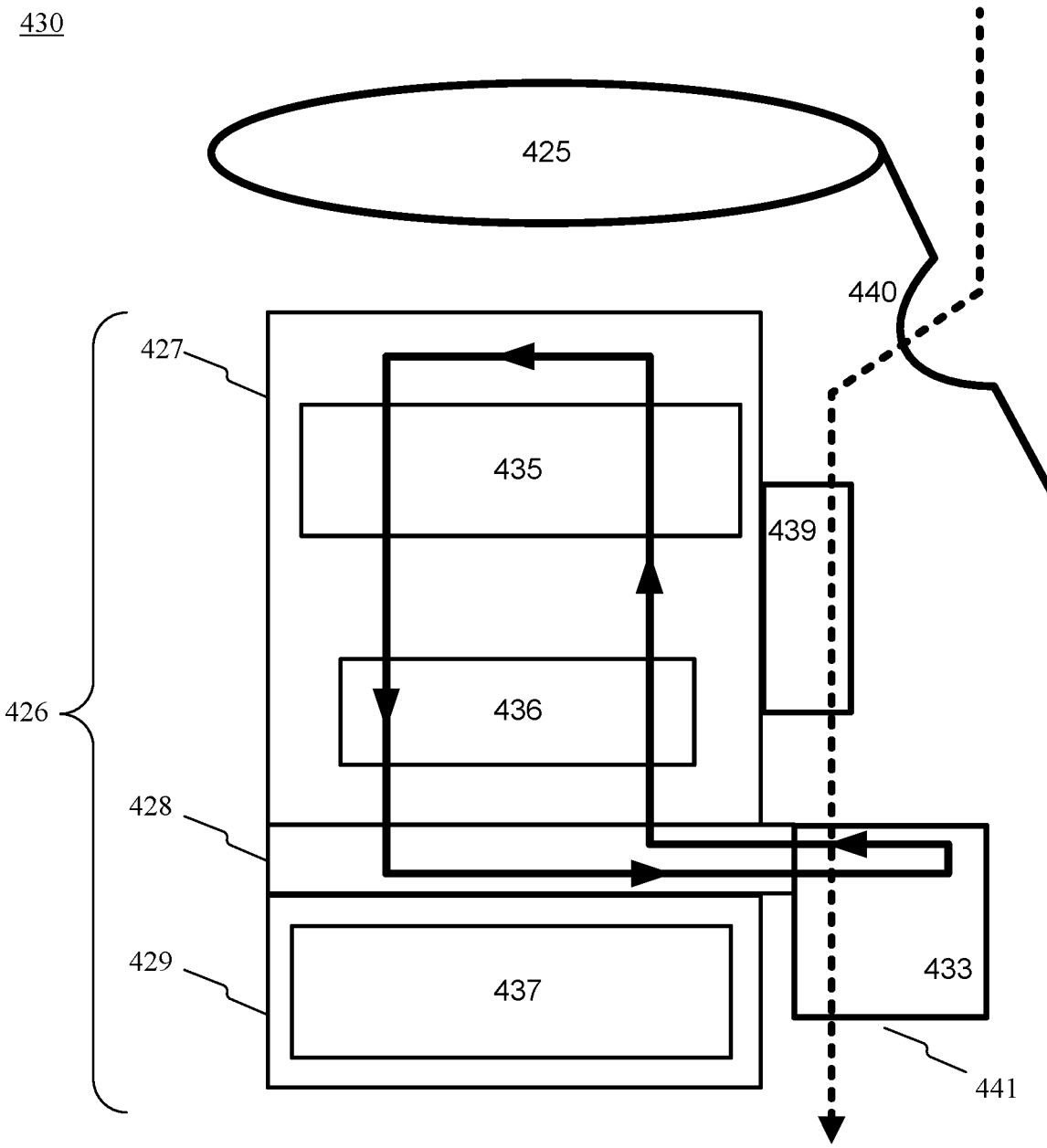

FIG. 4D schematically depicts a motor assembly 430 and surrounding elements of a VTOL aircraft, consistent with embodiments of the present disclosure. The embodiment of FIG. 4D may be similar to that of FIG. 4A with the addition of a second thermal transfer device, in the form of cooling fins 439. Cooling fins 439 may extend around the outside of enclosure 426, similar to the embodiment of FIG. 3B. Alternatively, cooling fins 439 may be shaped and arranged to conform to the particular airflow path of the VTOL aircraft in which it is implemented. In some embodiments, cooling fins 439 may be used as an alternative to heat exchanger 433. In some embodiments, the element 439 may comprise a heat exchanger, alternatively or in addition to heat exchanger 433. In the case of two heat exchangers, they may share a common oil flow path or operate on two different oil flow paths. Alternatively, one flow path may comprise oil that both lubricates and cools the components of motor assembly 430, while the other flow path comprises a coolant that is optimized for cooling only without any lubricating function.

Figure 4E:
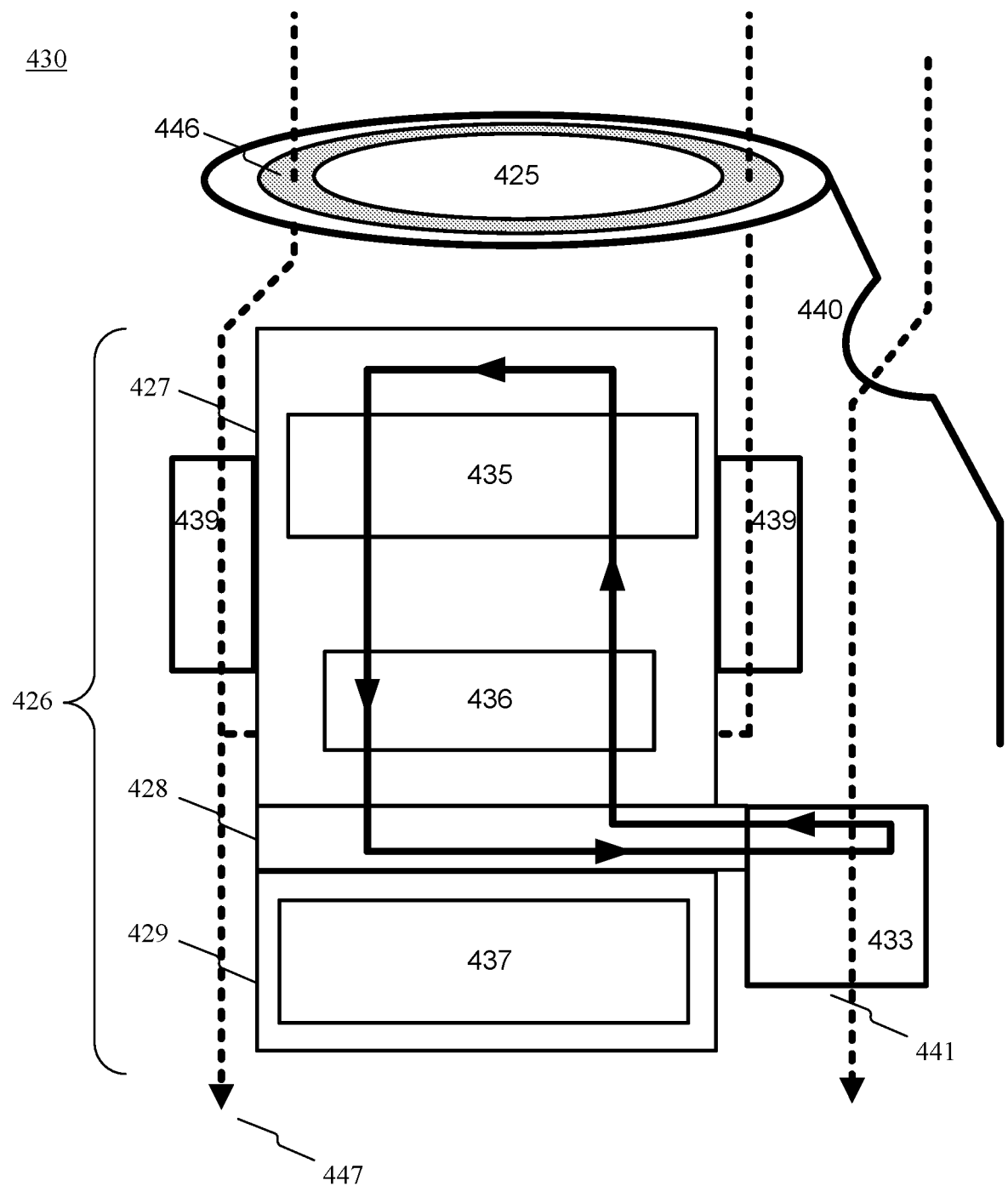

FIG. 4E schematically depicts a motor assembly 430 and surrounding elements of a VTOL aircraft, consistent with embodiments of the present disclosure. The embodiment of FIG. 4E may comprise a further annular air inlet 446. Annular air inlet 446 may allow air into a second cooling path in addition to a first cooling path from air inlet 440. For example, the second cooling path may direct air through cooling fins 439 and to a further outlet 247, similar to the arrangement shown in FIG. 2D. Alternatively, the second cooling path may direct air to the same outlet 441. For example, the second cooling path may merge with the first cooling path similar to configurations shown at FIG. 2E or any other suitable arrangement. Cooling fins 439 may surround motor enclosure 427 (as shown in cross-section at FIG. 4E) to increase thermal contact between the airflow and motor assembly 230.

Embodiments of the present disclosure may further be described with respect to the following clauses:

1. A tilt apparatus of a vertical takeoff and landing (VTOL) craft, comprising:
 a propeller configured to be tiltable between a lift configuration and a cruise configuration;
 a motor assembly coupled to the propeller; and
 a nacelle comprising an air inlet and an air outlet for a thermal transfer device configured to thermally couple to the motor assembly;
 wherein the air inlet is configured to receive a portion of a propwash from the propeller when the propeller is operated in the lift configuration;
 wherein the air outlet is configured so that an air pressure at the air outlet is less than an air pressure at the air inlet when the propeller is operated in the lift configuration.

2. The tilt apparatus of clause 1, wherein the air inlet is configured as a cut-out in the nacelle.

3. The tilt apparatus of clause 1, wherein the nacelle comprises an extending portion configured to extend from the air outlet.

4. The tilt apparatus of clause 3, further comprising a baffle;
 wherein the extending portion and the baffle are configured to form an exhaust channel when the propeller is operating in the cruise configuration.

5. The tilt apparatus of clause 4, wherein the extending portion and the baffle are configured to form the exhaust channel both when the propeller is operating in the lift configuration and when the propeller is operating in the cruise configuration.

6. The tilt apparatus of clause 4, further comprising an aperture in the baffle, the aperture configured to couple a region within the exhaust channel to a wake region caused by the propeller outside the exhaust channel.

7. The tilt apparatus of clause 6, wherein the aperture is configured to be closed in the cruise configuration.

8. The tilt apparatus of clause 4, wherein the extending portion and the baffle are configured to form the exhaust channel by tilting of the nacelle from the lift configuration to the cruise configuration.

9. The tilt apparatus of clause 4, further comprising a boom, the nacelle being tiltable with respect to the boom, wherein:
 a first portion of the baffle is mounted to the nacelle;
 a second portion of the baffle is mounted to the boom;
 the first portion and the second portion are configured to separate in the lift configuration; and
 the first portion and the second portion are configured to substantially unite in the cruise configuration.

10. The tilt apparatus of clause 4, further comprising a boom, wherein:
 the nacelle is movably mounted to a first portion of the boom; and
 the baffle is mounted in a fixed position to a second portion of the boom.

11. The tilt apparatus of clause 4, wherein the baffle and the extending portion are separated in the lift configuration so that the exhaust channel is not formed in the lift configuration.

12. The tilt apparatus of clause 4, wherein an area of a wake region in the lift configuration is greater than an area of the exhaust channel in the cruise configuration.

13. The tilt apparatus of clause 4, wherein the exhaust channel comprises an exhaust outlet configured to exhaust air from the air outlet to an exterior of the tilt apparatus, the exhaust outlet being formed from the extending portion and the baffle.

14. The tilt apparatus of clause 3, wherein the extending portion forms an extended negative pressure zone at the air outlet when the propeller is operated in the lift configuration.

15. The tilt apparatus of clause 3, wherein the extending portion comprises a depth of at least four inches.

16. The tilt apparatus of clause 3, wherein the extending portion comprises a depth of not more than 20 inches.

17. The tilt apparatus of clause 3, wherein the extending portion comprises an arc length of at least 45 degrees around a rotational axis of the propeller.

18. The tilt apparatus of clause 3, wherein the extending portion comprises an arc length of not more than 270 degrees around a rotational axis of the propeller.

19. The tilt apparatus of clause 1, wherein the air outlet is configured to be in a low pressure zone created by a further portion of the propwash passing along an outside of the nacelle.

20. The tilt apparatus of clause 1, wherein the propeller propwash creates a negative pressure zone at the air outlet relative to the air inlet.

21. The tilt apparatus of clause 1, wherein the thermal transfer device comprises a heat exchanger.

22. The tilt apparatus of clause 1, wherein the air inlet is configured to face the propeller.

23. The tilt apparatus of clause 1, wherein the air inlet is located a distance from a rotational axis of the propeller that is within 15% of a propeller radius.

24. The tilt apparatus of clause 1, wherein the air inlet is located a distance from a rotational axis of the propeller that is within 25% of a propeller radius.

25. The tilt apparatus of clause 1, wherein the air inlet is located a distance from a rotational axis of the propeller that is within 50% of a propeller radius.

26. The tilt apparatus of clause 1, further comprising a baffle configured to direct air from the air outlet when the propeller is in the cruise configuration.

27. The tilt apparatus of clause 26, further comprising:
   a boom;
   wherein the nacelle is movably mounted to a first portion of a boom, and the baffle is mounted in a fixed position to a second portion of the boom.

28. The tilt apparatus of clause 1, wherein an open air volume at the air outlet is greater in the lift configuration than in the cruise configuration.

29. The tilt apparatus of clause 1, wherein the propeller is configured to direct air into the air inlet.

30. The tilt apparatus of clause 1, wherein the air inlet is located at a lower side of the nacelle in the cruise configuration.

31. The tilt apparatus of clause 1, further comprising:
   a tilt actuator,
   wherein the tilt actuator is configured to move the propeller, the motor assembly, and the nacelle between the lift configuration and the cruise configuration.

32. The tilt apparatus of clause 1, further comprising an annular air inlet located at a top portion of the nacelle.

33. The tilt apparatus of clause 1, wherein the nacelle comprises a clamshell segment configured to open in the lift configuration.

34. A vertical takeoff and landing (VTOL) craft comprising the tilt apparatus of any of clauses 1-33.

35. A method of operating a tilt apparatus of a vertical takeoff and landing (VTOL) craft, comprising:
   tilting a propeller to a lift configuration, the propeller being coupled to a motor assembly;
   directing propwash from the tilt propeller over an outside of a nacelle, the nacelle comprising an air inlet and an air outlet for a thermal transfer device configured to thermally couple to the motor assembly; and
   generating a negative pressure zone at the air outlet by the propwash directed over the outside of the nacelle, the negative pressure zone causing air to flow from the air inlet to the air outlet.

36. The method of clause 35, further comprising:
   tilting the propeller from the lift configuration to the cruise configuration;
   forming an exhaust channel for the air outlet in the cruise configuration, the exhaust channel comprising an extending portion of the nacelle and a baffle; and
   exhausting air from the air outlet via the exhaust channel.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

The invention claimed is:

1. A tilt apparatus of a vertical takeoff and landing (VTOL) craft, comprising:
   a boom;
   a propeller configured to be tiltable with respect to the boom between a lift configuration and a cruise configuration;
   a motor assembly coupled to the propeller;
   a nacelle connected to the motor assembly and configured to be tiltable with the propeller between the lift configuration and the cruise configuration; and
   a thermal transfer device configured to thermally couple to the motor assembly, the thermal transfer device comprising an air outlet;
   the nacelle comprising an air inlet and an extending portion configured to extend from the air outlet; and
   a baffle attached to the boom and extending beyond a front surface of the boom, such that a leading edge of the baffle is forward of a trailing edge of the extending portion when the nacelle is in the cruise configuration,
   wherein the air inlet is configured to receive a portion of a propwash from the propeller when the propeller is operated in the lift configuration.

2. The tilt apparatus of claim 1, wherein the air inlet is configured as a cut-out in the nacelle.

3. The tilt apparatus of claim 1,
   wherein the extending portion and the baffle are configured to overlap to form upper and lower surfaces of an exhaust channel from the air outlet to an exhaust outlet when the propeller is operating in the cruise configuration.

4. The tilt apparatus of claim 3, wherein the extending portion and the baffle are configured to form the exhaust channel by tilting of the nacelle from the lift configuration to the cruise configuration.

5. The tilt apparatus of claim 3, wherein:
   the nacelle is movably mounted to a first portion of the boom; and
   the baffle is mounted in a fixed position to a second portion of the boom.

6. The tilt apparatus of claim 3, wherein the baffle and the extending portion are separated in the lift configuration so that the exhaust channel is not formed in the lift configuration.

7. The tilt apparatus of claim 3, wherein an area of a wake region in the lift configuration is greater than an area of the exhaust channel in the cruise configuration.

8. The tilt apparatus of claim 3, wherein the exhaust outlet is configured to exhaust air from the air outlet to an exterior of the tilt apparatus, the exhaust outlet being formed from the extending portion and the baffle.

9. The tilt apparatus of claim 1, wherein the extending portion forms an extended negative pressure zone at the air outlet when the propeller is operated in the lift configuration.

10. The tilt apparatus of claim 1, wherein the extending portion extends at least four inches from the air outlet.

11. The tilt apparatus of claim 1, wherein the extending portion extends not more than 24 inches from the air outlet.

12. The tilt apparatus of claim 1, wherein the extending portion comprises an arc length of at least 45 degrees around a rotational axis of the propeller.

13. The tilt apparatus of claim 1, wherein the extending portion comprises an arc length of not more than 270 degrees around a rotational axis of the propeller.

14. The tilt apparatus of claim 1, wherein the air outlet is configured to be in a low pressure zone created by a further portion of the propwash passing along an outside of the nacelle.

15. The tilt apparatus of claim 1, wherein the propeller propwash creates a negative pressure zone at the air outlet relative to the air inlet.

16. The tilt apparatus of claim 1, wherein the thermal transfer device comprises a heat exchanger.

17. The tilt apparatus of claim 1, wherein the air inlet is configured to face the propeller.

18. The tilt apparatus of claim 1, wherein the air inlet is located within 25% of a propeller radius.

19. The tilt apparatus of claim 1, wherein an open air volume at the air outlet is greater in the lift configuration than in the cruise configuration.

20. The tilt apparatus of claim 1, wherein the propeller is configured to direct air into the air inlet.

21. The tilt apparatus of claim 1, wherein the air inlet is located at a lower side of the nacelle in the cruise configuration.

22. A method of operating a tilt apparatus of a vertical takeoff and landing (VTOL) craft, comprising:
    tilting a nacelle and a propeller with respect to a boom into a lift configuration, the propeller being coupled to a motor assembly, the motor assembly being connected to the nacelle, the boom having an attached baffle extending beyond a front surface of the boom;
    directing propwash from the tilt propeller to an air inlet of the nacelle and further to an air outlet of a thermal transfer device configured to thermally couple to the motor assembly, the nacelle comprising an extending portion configured to extend from the air outlet; and
    tilting the nacelle and the propeller from the lift configuration to a cruise configuration such that a leading edge of the baffle is forward of a trailing edge of the extending portion when the nacelle is in the cruise configuration.

23. The method of claim 22, further comprising:
    forming an exhaust channel for the air outlet in the cruise configuration, the exhaust channel comprising the extending portion and the baffle; and
    exhausting air from the air outlet via the exhaust channel.

24. The method of claim 23, further comprising:
    in the lift configuration, generating a negative pressure zone at the air outlet by directing a further propwash over an outside of the nacelle, the negative pressure zone causing air to flow from the air inlet to the air outlet.

25. The method of claim 23, wherein the extending portion extends at least four inches from the air outlet.

26. The method of claim 23, wherein the extending portion extends at least eight inches from the air outlet.

27. The method of claim 23, wherein the extending portion extends at least twelve inches from the air outlet.

28. The method of claim 23, wherein the extending portion extends not more than 24 inches from the air outlet.

29. The method of claim 23, wherein:
    the boom is mounted to a wing; and
    the extending portion extends from the air outlet by not more than half a distance from the wing to a front of the boom.

30. The apparatus of claim 1, wherein the apparatus is configured so that an air pressure at the air outlet is less than an air pressure at the air inlet when the propeller is operated in the lift configuration.

31. The tilt apparatus of claim 1, wherein the extending portion extends at least eight inches from the air outlet.

32. The tilt apparatus of claim 1, wherein the extending portion extends at least twelve inches from the air outlet.

33. The tilt apparatus of claim 1, further comprising a wing, wherein:
    the boom is mounted to the wing, and
    the extending portion extends from the air outlet by not more than half a distance from the wing to a front of the boom.

* * * * *